United States Patent
Ishikawara et al.

(10) Patent No.: US 11,879,754 B2
(45) Date of Patent: Jan. 23, 2024

(54) STROKE SENSOR MODULE, STRUCTURE AND METHOD FOR MOUNTING STROKE SENSOR MODULE

(71) Applicant: TDK Corporation, Tokyo (JP)

(72) Inventors: Toshio Ishikawara, Tokyo (JP); Keiji Suzuki, Tokyo (JP); Tatsuya Kato, Tokyo (JP); Toshihiko Oyama, Tokyo (JP); Takahiro Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/169,790

(22) Filed: Feb. 8, 2021

(65) Prior Publication Data

US 2021/0293577 A1 Sep. 23, 2021

(30) Foreign Application Priority Data

Mar. 18, 2020 (JP) .................................. 2020-048328
Dec. 3, 2020 (JP) .................................. 2020-201103

(51) Int. Cl.
*G01D 5/14* (2006.01)
*H01F 7/06* (2006.01)
*G01D 11/30* (2006.01)

(52) U.S. Cl.
CPC ............... *G01D 5/14* (2013.01); *G01D 11/30* (2013.01); *H01F 7/06* (2013.01)

(58) Field of Classification Search
CPC ...... G01D 11/30; G01D 2205/40; G01D 5/14; G01D 5/145
See application file for complete search history.

(56) References Cited

U.S. PATENT DOCUMENTS

| 2003/0000307 | A1* | 1/2003 | Lohberg | ................. | G01D 5/145 |
| | | | | | 73/514.39 |
| 2007/0068499 | A1* | 3/2007 | Schneider | .............. | F02M 26/48 |
| | | | | | 123/568.21 |
| 2012/0126796 | A1* | 5/2012 | Drespling | .............. | G01D 5/145 |
| | | | | | 324/207.2 |
| 2014/0331758 | A1* | 11/2014 | Sim | .......................... | G01L 5/28 |
| | | | | | 73/132 |

(Continued)

FOREIGN PATENT DOCUMENTS

| CN | 104149758 A | 11/2014 |
| JP | S59-031015 U | 2/1984 |

(Continued)

*Primary Examiner* — Son T Le
*Assistant Examiner* — Adam S Clarke
(74) *Attorney, Agent, or Firm* — POSZ LAW GROUP, PLC

(57) ABSTRACT

A stroke sensor module is provided in which the contact area where the moving element slides on the main body is limited.

A stroke sensor module has: a moving element that is moved in a first direction; a magnetic field generator that is moved in the first direction together with the moving element; a magnetic field detecting element that detects movement of the magnetic field generator; and a housing that houses a part of the moving element and the magnetic field generator. At least either the moving element or the magnetic field generator has a plurality of protrusions that are provided at different angular positions, as viewed in the first direction, and the housing has guide portions that guide the protrusions.

47 Claims, 17 Drawing Sheets

(56) References Cited

U.S. PATENT DOCUMENTS

2018/0003299 A1\* 1/2018 Ebina ................. G01D 5/145

FOREIGN PATENT DOCUMENTS

| JP | H11-141355 A | 5/1999 |
|----|--------------|--------|
| JP | 2004-279329 A | 10/2004 |
| JP | 2006-300631 A | 11/2006 |
| JP | 2012-107929 A | 6/2012 |
| JP | 2013-500484 A | 1/2013 |
| JP | 2014-095615 A | 5/2014 |

\* cited by examiner

STROKE SENSOR MODULE, STRUCTURE AND METHOD FOR MOUNTING STROKE SENSOR MODULE

CROSS REFERENCE TO RELATED APPLICATION

The present application is based on, and claims priority from JP2020-48328 filed on Mar. 18, 2020 and JP2020-201103 filed on Dec. 3, 2020, the disclosure of which is hereby incorporated by reference herein in its entirety.

1. TECHNICAL FIELD

The present invention relates to a stroke sensor module, and a structure and a method for mounting the stroke sensor module.

2. BACKGROUND

A stroke sensor is known that measures the moving distance of an element that linearly moves, such as the amount of depression of a brake pedal or an accelerator pedal of a vehicle. JP2012-107929 discloses a position detecting apparatus that has a moving element that is movable in a housing and a magnetic field detecting element that is attached to the housing. The moving element houses a magnet and can be moved together with an object to be detected. The moving distance of the moving element, that is, the moving distance of the object to be detected can be detected by the magnetic field detecting element detecting a magnetic field that changes together with the movement of the moving element. The moving element has a main body that houses the magnet and a rod that is connected to the main body. The rod penetrates through a hole of the housing so as to extend in and outside of the housing. In this position detecting apparatus, since the housing, the moving element and the magnetic field detecting element are integrated, there is no need to separately mount the moving element and the magnetic field detecting element. In addition, calibration can be performed in advance.

Since the main body of the moving element slides in the housing, fine particles may be generated when the moving element slides on the main body. The fine particles accumulate in the housing and may prevent the moving element from smoothly moving.

SUMMARY

The present invention aims at providing a stroke sensor module in which the contact area where the moving element slides on the main body is limited.

A stroke sensor module of the present invention comprises: a moving element that is moved in a first direction; a magnetic field generator that is moved in the first direction together with the moving element; a magnetic field detecting element that detects movement of the magnetic field generator; and a housing that houses a part of the moving element and the magnetic field generator. At least either the moving element or the magnetic field generator has a plurality of protrusions that are provided at different angular positions, as viewed in the first direction, and the housing has guide portions that guide the protrusions.

According to the present invention, it is possible to provide a stroke sensor module in which the contact area where the moving element slides on the main body is limited.

The above and other objects, features and advantages of the present invention will become apparent from the following description with reference to the accompanying drawings which illustrate examples of the present invention.

DETAILED DESCRIPTION

Figure 1A:
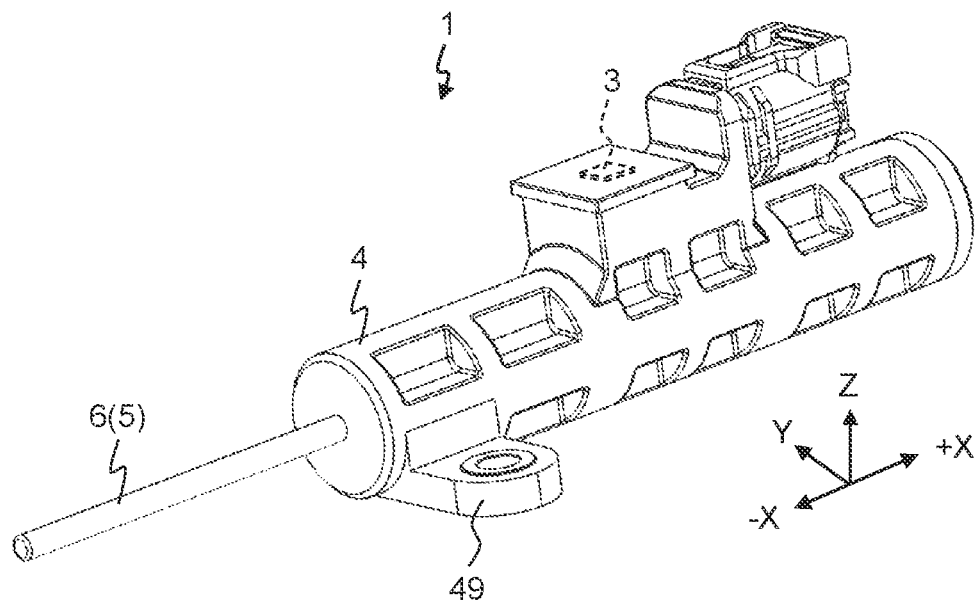
FIGS. 1A and 1B are perspective views of a stroke sensor module according to a first embodiment of the present invention.

Referring to the drawings, several embodiments of the present invention will be described. In each embodiment, the direction in which moving element 5 is moved is referred to as the X direction (the first direction). The direction in which moving element 5 pushes magnetic field generator 2 is referred to as the +X direction, and the direction opposite thereto is referred to as the −X direction. The direction that is perpendicular to the X direction and that is parallel to the mounting surface of stroke sensor module 1 is referred to as the Y direction, and the direction that is perpendicular both to the X direction and to the Y direction, that is, the direction that is perpendicular to the mounting surface is referred to as the Z direction.

First Embodiment

Figure 1B:
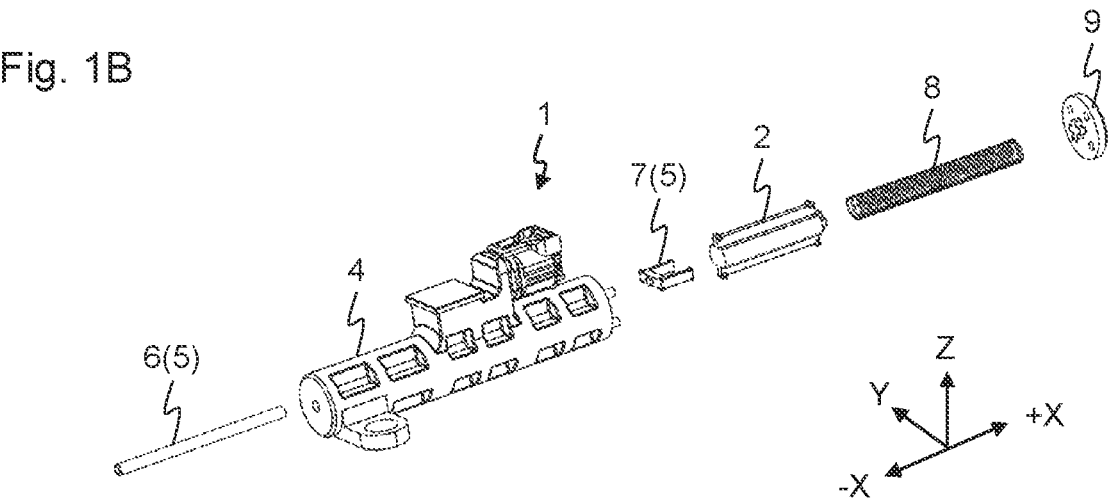
Figure 2A:
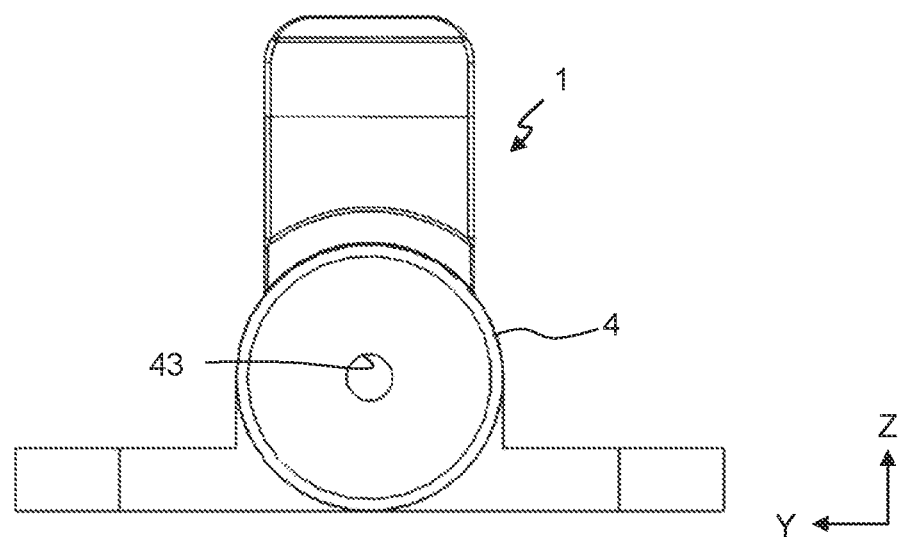
FIGS. 2A and 2B are side views of the stroke sensor module shown in FIGS. 1A and 1B.
Figure 2B:
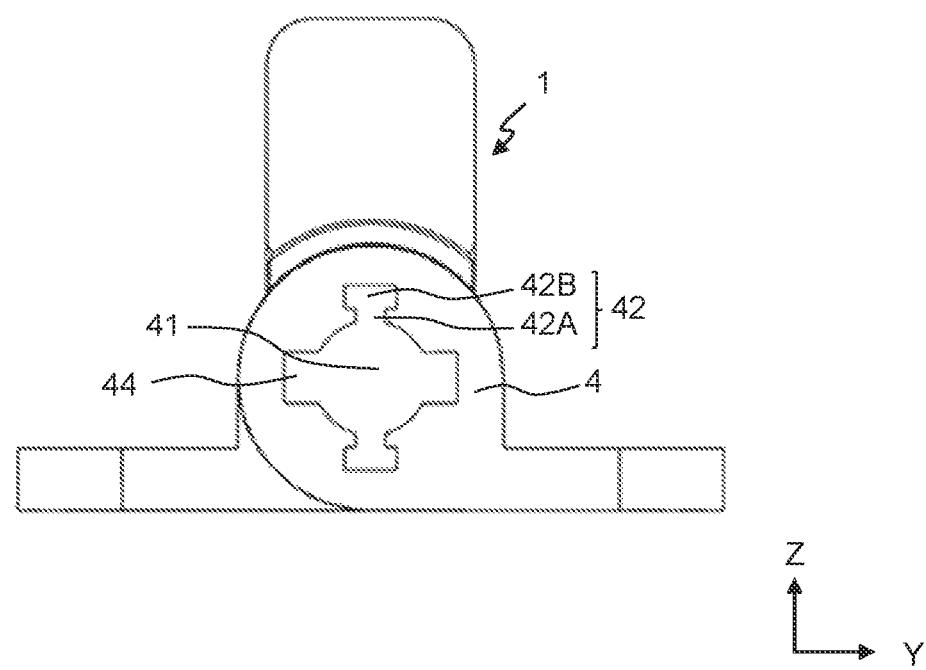
Figure 3A:
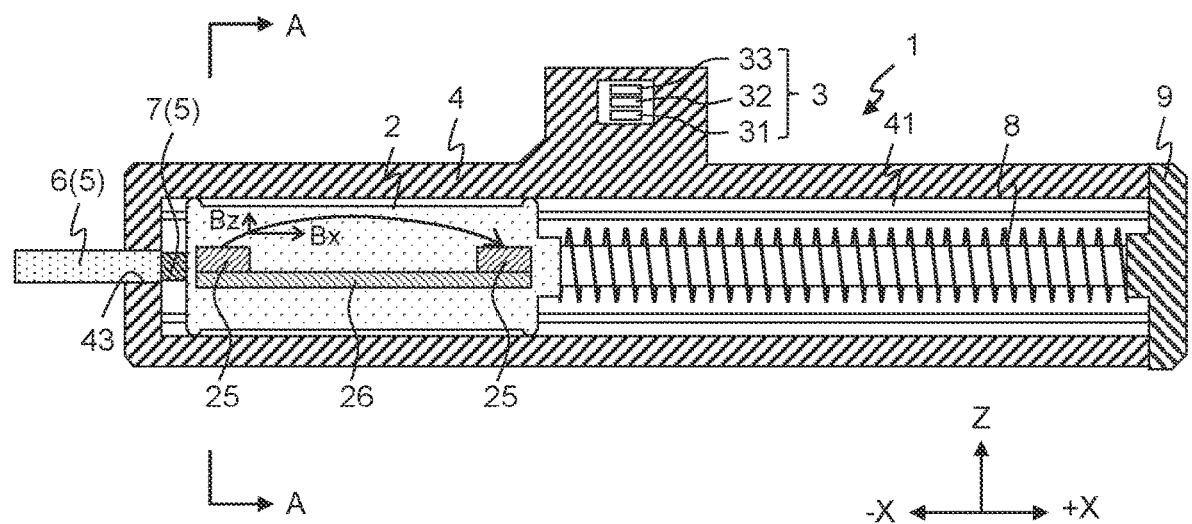
FIGS. 3A and 3B are cross sectional views of the stroke sensor module shown in FIGS. 1A and 1B.
Figure 3B:
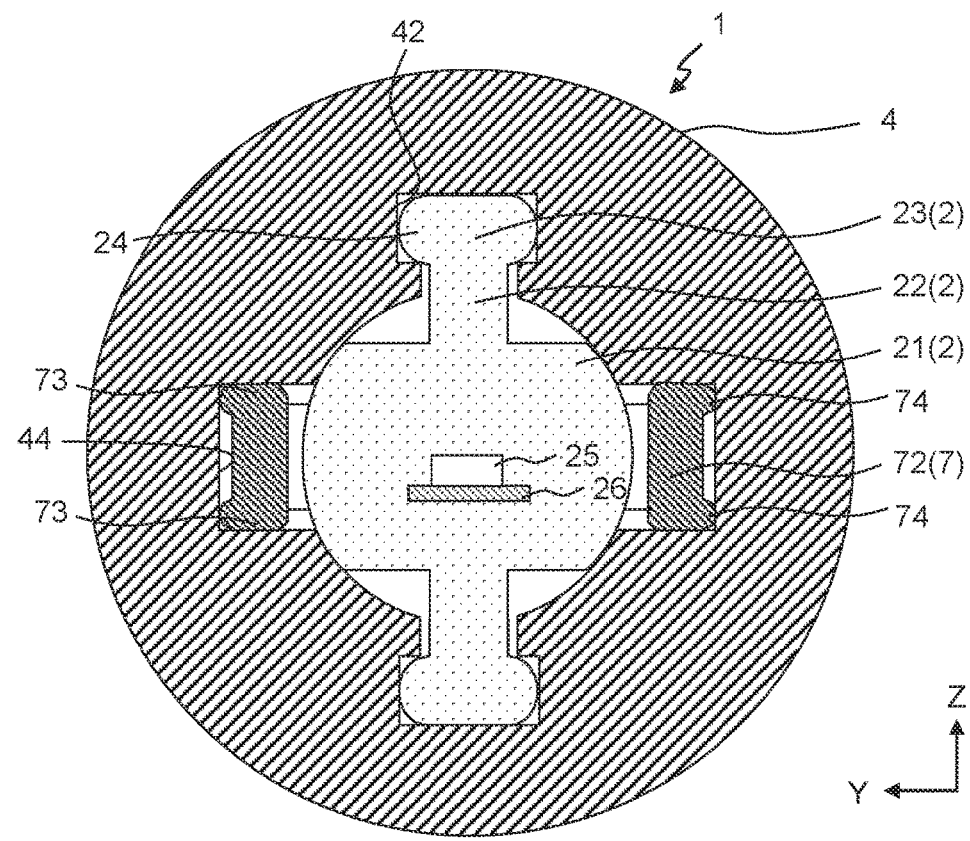

FIG. 1A generally shows a perspective view of stroke sensor module 1, and FIG. 1B shows an exploded perspective view of stroke sensor module 1. FIG. 2A shows a side view of stroke sensor module 1, as viewed from moving element 5, and FIG. 2B shows a side view of stroke sensor module 1, as viewed from cover member 9 (note that cover member 9 and the inner structure are not illustrated). FIG. 3A shows a cross sectional view of stroke sensor module 1, and FIG. 3B shows a cross sectional view taken along line A-A in FIG. 3A. Stroke sensor module 1 has magnetic field generator 2 that generates a magnetic field, magnetic field detecting element 3 that detects the movement of magnetic field generator 2, housing 4 that houses these elements, as well as moving element 5 that is moved in the X direction together with magnetic field generator 2. Stroke sensor module 1 is attached to the mounting surface that is parallel to the X-Y plane at mounting portion 49 of in housing 4. These elements will now be described in detail.

Figure 4A:
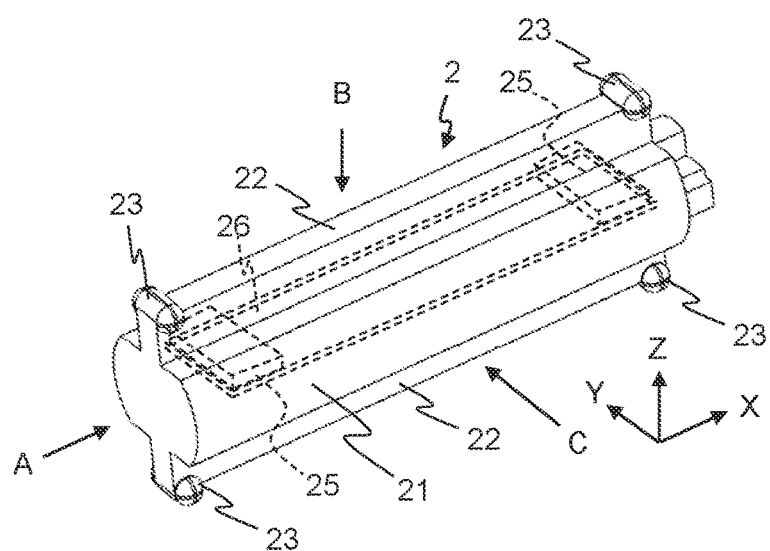
FIGS. 4 A to 4D are views of a magnetic field generator.
Figure 4B:
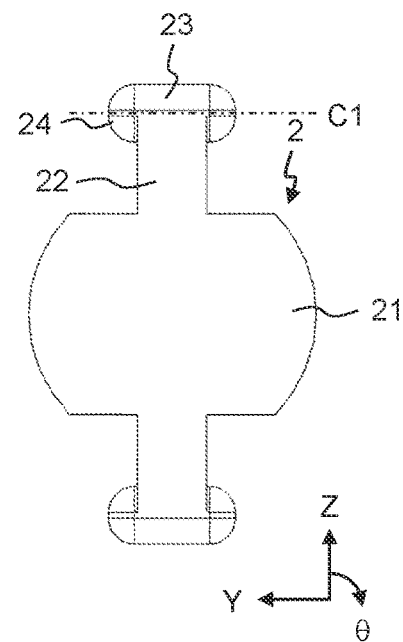
Figure 4C:
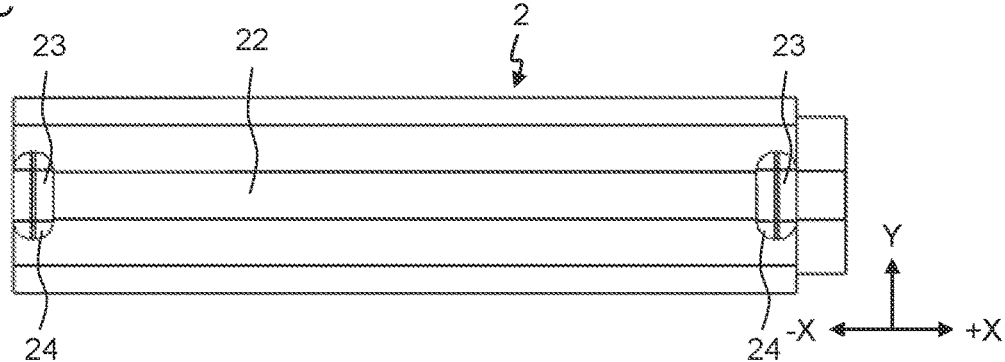
Figure 4D:
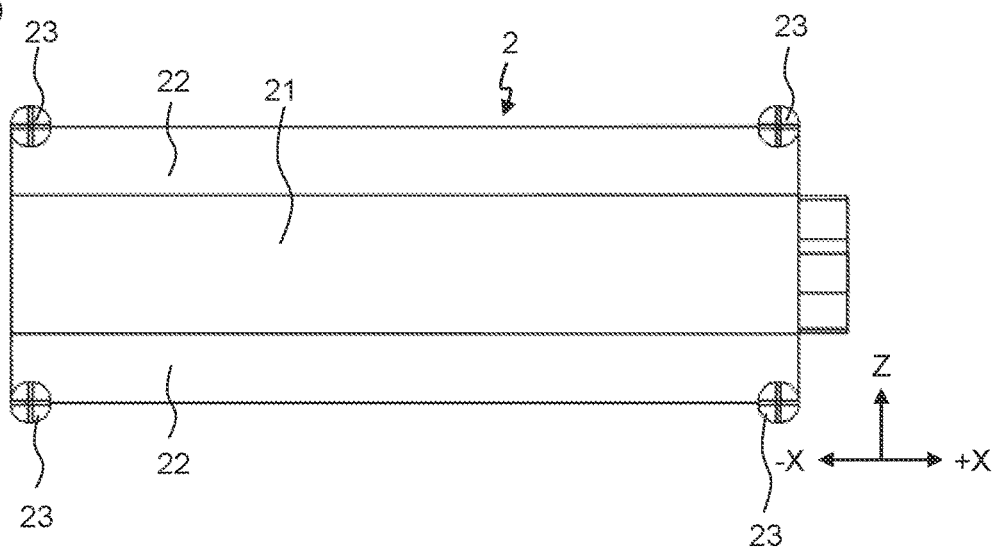

FIG. 4A shows a perspective view of magnetic field generator 2, FIG. 4B shows a side view of magnetic field generator 2, as viewed in direction A in FIG. 4A, FIG. 4C shows a top view of magnetic field generator 2, as viewed in direction B in FIG. 4A, and FIG. 4D shows a front view of magnetic field generator 2, as viewed in direction C in FIG. 4A. Magnetic field generator 2 has substantially cylindrical main body 21 that is elongate in the X direction and plate-like base portions 22 that extend in the X direction along main body 21. Main body 21 is formed of resin except for magnets 25 and yoke 26. Main body 21 can be moved in the +X direction and in the −X direction by the action of moving element 5, described later, and by spring member 8. Main body 21 is provided with two magnets 25 on both sides thereof in the X direction. The surfaces of two magnets 25 that face magnetic field detecting element 3 have different polarities. Accordingly, as shown in FIG. 3A, a substantially sinusoidal magnetic flux is generated between two magnets 25. Two magnets 25 are supported by yoke 26 that is formed of a soft magnetic material. Yoke 26 enhances the intensity of a magnetic field that is generated by magnets 25. Base portion 22 extends from one end to the other end of main body 21 regarding the X direction. Base portions 22 (and first protrusions 23, described later) are provided at the top and at the bottom of main body 21. Specifically, when the angular position is zero degree at the top, base portions 22 (and first protrusions 23) are provided at angular position θ of zero degree and at angular position θ of 180 degrees, as viewed in the X direction (see FIG. 4B for the definition of angular position θ). The number and position of base portions 22 (and first protrusions 23) is not limited. For example, base portions 22 (and first protrusions 23) may be positioned at angular positions θ of 90 degrees and 270 degrees. Three or more base portions 22 may be provided. In that case, base portions 22 (and first protrusions 23) are preferably arranged at a constant angular interval. For example, three base portions 22 (and first protrusions 23) may be provided at an angular interval of 120 degrees.

A plurality of first protrusions 23 is formed at the tops of base portions 22. The strength of first protrusions 23 can be enhanced by providing base portions 22, as compared to providing long protrusions that protrude from main body 21. First protrusions 23 are formed at both ends of each base portion 22 in the X direction. Therefore, magnetic field generator 2 has four first protrusions 23 in total, and some of them and the others are positioned at different angular positions θ. By providing first protrusions 23 at both ends of each inner space 22 in the X direction, magnetic field generator 2 can be stably moved. Furthermore, by providing some of first protrusions 23 and the other first protrusions 23 at different angular positions θ, magnetic field generator 2 is restricted in the Y and Z directions, and magnetic field generator 2 can be stably moved. Especially, in the present embodiment, first protrusions 23 are provided in magnetic field generator 2 at angular positions θ opposite to each other. Therefore, it is possible to stabilize magnetic field generator 2 by a minimum number of first protrusions 23.

First protrusions 23 have the same shape. First protrusions 23 are ridges that extend in the Y direction. Each first protrusion 23 has a longitudinal axis or central axis C1 in the Y direction and extends in the Y direction between both sides of base portion 22. Base portions 22 and first protrusions 23 are formed of resin and are made by insert molding together with main body 21. Magnets 25 that are provided at both ends of magnetic field generator 2 regarding the X direction face corresponding first protrusions 23. For example, magnet 25 and corresponding first protrusions 23 are positioned on a straight line that extends in parallel with the Z direction. Each first protrusion 23 has curved first end protrusions 24 at both ends thereof regarding the direction parallel to central axis C1 (the Y direction).

Housing 4 has substantially cylindrical inner space 41 that is elongate in the X direction, and magnetic field generator 2 is housed in inner space 41. Housing 4 is formed of resin. First guide portions 42 that guide first protrusions 23 of magnetic field generator 2 are formed in inner space 41 at angular positions θ of zero degree and 180 degrees. First guide portion 42 are first grooves 42 that house respective first protrusions 23 of magnetic field generator 2 and that extend in the X direction. As shown in FIG. 2B, each first groove 42 has a T-shaped cross section, as viewed in the X direction. Each first groove 42 has base housing portion 42A that is connected to inner space 41 and that houses base portion 22, and protrusion housing portion 42B that is connected to base housing portion 42A and that houses first protrusions 23 on both sides. Base housing portion 42A extends in the radial direction (the Z direction) from the inner circumferential surface of inner space 41, and protrusion housing portion 42B extends in the tangential direction of inner space 41 (the Y direction) from the end of base housing portion 42A.

Circular hole 43 that communicates with inner space 41 is formed on the X direction end surface of housing 4 that faces magnetic field generator 2. Hole 43 has an inner diameter that is larger than the outer diameter of rod 6 of moving element 5, described later. In inner space 41, spring member 8 that is formed of stainless steel is provided on the side opposite to moving element 5 or hole 43, with magnetic field generator 2 interposed therebetween. The X direction end surface of housing 4 opposite to hole 43 has an opening, which is closed by cover member 9 that is formed of resin. Spring member 8 biases magnetic field generator 2 in the −X direction toward moving element 5. When stroke sensor module 1 is assembled, moving element 5 is arranged in inner space 41 of housing 4 through the opening such that rod 6 protrudes from hole 43, and magnetic field generator 2 is then housed in inner space 41, and spring member 8 is then housed in inner space 41, and lastly the opening is closed by cover member 9. Spring member 8 is compressed by magnetic field generator 2 and cover member 9 holding both ends of spring member 8.

Figure 5A:
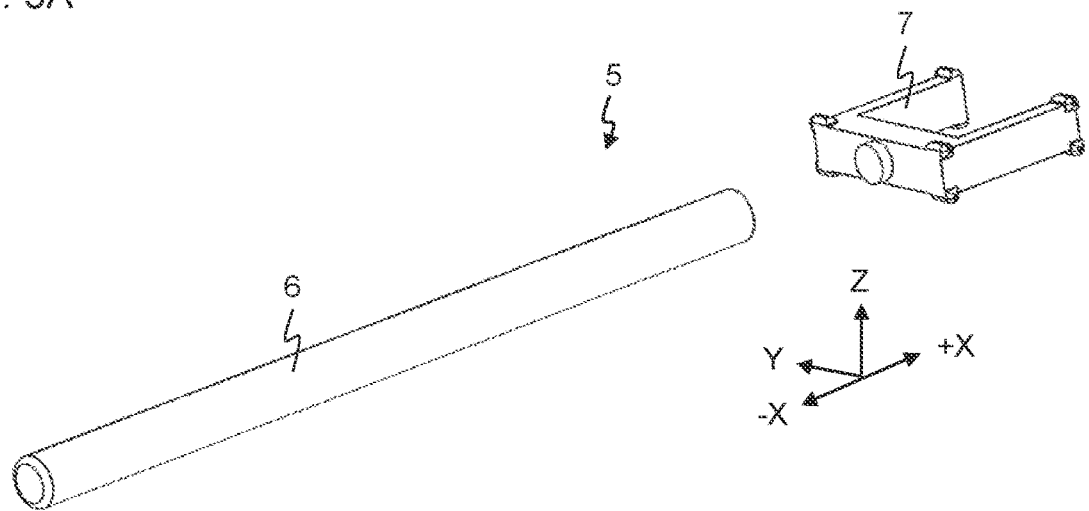
FIGS. 5A to 5C are views of a moving element.
Figure 5B:
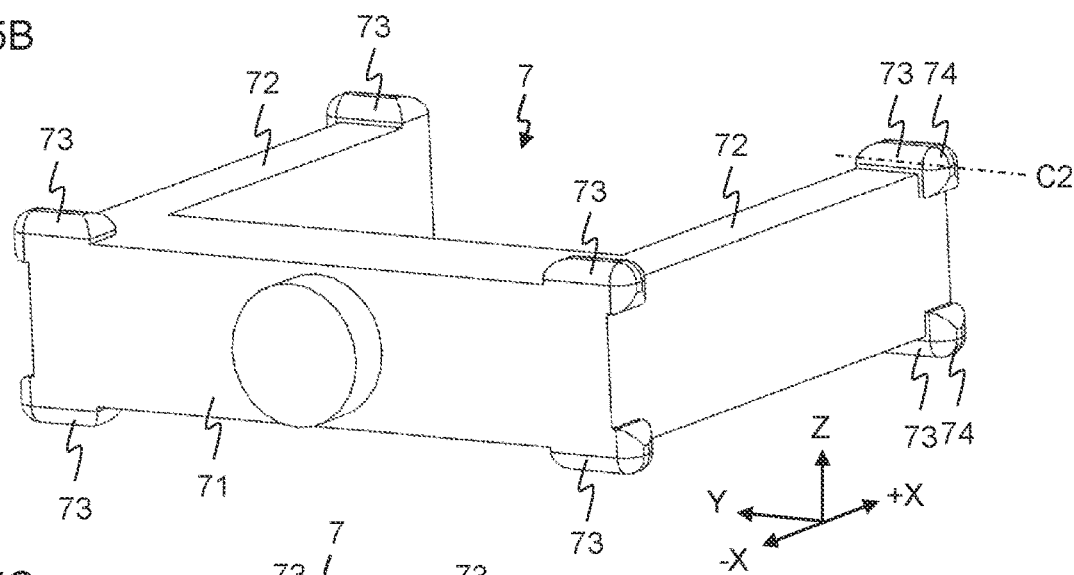
Figure 5C:
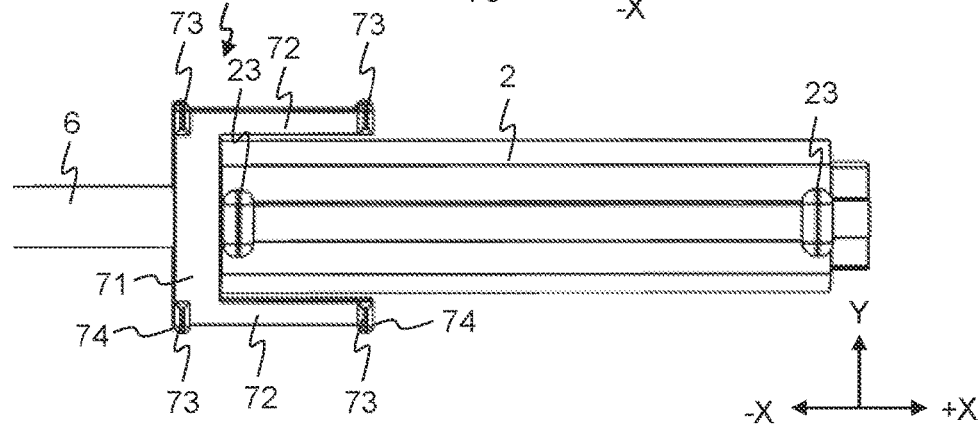

FIG. 5A shows an exploded perspective view of moving element 5, FIG. 5B shows a perspective view of spring 7, and FIG. 5C shows a top view of moving element 5 and magnetic field generator 2. Moving element 5 has cylindrical rod 6 that is connected to an object to be detected (not illustrated), and connecting portion 7 that is attached to one end of rod 6. Rod 6 is formed of stainless steel, and connecting portion 7 is formed of resin. These elements are integrally formed by insert molding. Hole 43 is sized so as not to allow connecting portion 7 to pass therethrough, and connecting portion 7 is held in inner space 41. Rod 6 is movably inserted into hole 43. Connecting portion 7 has base portion 71 that is attached to rod 6 and that extends in the Y direction, and a pair of arm portions 72 that extend in the X direction from both ends of base portion 71 regarding the Y direction. Magnetic field generator 2 is in contact with base portion 71 due to the biasing force of spring member 8 and is sandwiched by arm portions 72. Connecting portion 7 and magnetic field generator 2 are not bonded to each other, for example, by adhesive means, and magnetic field generator 2 is only allowed to move in the X direction together with the movement of rod 6.

Connecting portion 7 has a plurality of second protrusions 73 that have the same shape as first protrusions 23. Four second protrusions 73 are provided on the upper surface of connecting portion 7, i.e., at the ends of arm portions 72 in the X direction and at both ends of base portion 71 in the Y direction. Four second protrusion 73 are also provided on the lower surface of connecting portion 7 at the same positions. Second protrusions 73 are ridges that extend in the Y direction. Each second protrusion 73 that is provided at the end of arm portion 72 has a longitudinal axis or central axis C2 in the Y direction and extends in the Y direction between both sides of arm portion 72. Second protrusions 73 that are provided at both ends of base portion 71 in the Y direction have the same shape as second protrusion 73 that are provided at the ends of arm portions 72. Each second protrusion 73 has curved second end protrusions 74 at both ends thereof regarding a direction parallel to central axis C2 (the Y direction). Second end protrusions 74 of connecting portion 7 have the same effect as first end protrusions 24 of magnetic field generator 2. Second guide portions 44 that guide second protrusions 73 of connecting portion 7 are formed in inner space 41 of housing 4 at angular positions θ of 90 degrees and 270 degrees. Second guide portion 44 are second grooves 44 that house respective second protrusions 73 of connecting portion 7 and that extend in the X direction. Each second groove 44 has a substantially rectangular cross section, as viewed in the X direction.

Magnetic field detecting element 3 detects a magnetic field that is generated by field magnetic field generator 2. Magnetic field detecting element 3 is mounted in housing 4 outside of inner space 41. Magnetic field detecting element 3 has a Hall element, but may alternatively have a magnetoresistive element, such as a TMR element. Magnetic field detecting element 3 has Hall element 31 that detects magnetic flux density Bx in the X direction, Hall element 32 that detects magnetic flux density Bz in the Z direction, and processor 33 that calculates the angle of the magnetic field=arctan (Bz/Bx). The relationship between the angle of the magnetic field and the positions of magnets 25 relative to magnetic field detecting element 3 in the X direction is obtained in advance. Processor 33 converts the angle of the magnetic field into output voltage, which corresponds to the relative position in the X direction, by means of conversion means, and outputs the output voltage.

Stroke sensor module 1 works in the following manner. In FIG. 3A, when rod 6 and connecting portion 7 are moved in the +X direction together with the object to be detected, base portion 71 of connecting portion 7 pushes magnetic field generator 2 in the +X direction against the biasing force of spring member 8. The relative position in the X direction between magnets 25 and magnetic field detecting element 3 is changed, and magnetic field detecting element 3 outputs output voltage accordingly. When rod 6 and connecting portion 7 are moved in the −X direction, magnetic field generator 2 is moved in the −X direction by the biasing force of spring member 8. The contact between connecting portion 7 and magnetic field generator 2 is maintained by the biasing force of spring member 8.

When magnetic field generator 2 is moved in the X direction in inner space 41 of housing 4, a plurality of first protrusions 23 is guided by first guide portions 42. There is only a slight gap between first protrusions 23 and first grooves 42. Since first protrusions 23 are substantially restricted in the Y direction and in the Z direction by first grooves 42, the relative position between magnets 25 and magnetic field detecting element 3 in the Y direction and in the Z direction is substantially constant. As a result, the accuracy of stroke sensor module 1 can be enhanced. Since the rotation of magnetic field generator 2 about the X axis is also substantially restricted, the normal lines of magnets 25 of magnetic field generator 2 are kept directed in the Z direction. As a result, any measurement error that is caused by the rotation of magnets 25 can be reduced. In addition, when magnetic field generator 2 is moved in the X direction in inner space 41 of housing 4, the tops of first protrusions 23 in the Z direction are in line contact with first guide portions 42. This is because the portion of first protrusion 23 that is in line contact with top first guide portion 42 in the Z direction is a part of a curved surface of first protrusion 23 that protrudes in a direction away from central axis C1. Accordingly, the area where magnetic field generator 2 slides on the inner wall of housing 4 is significantly reduced, as compared to a case where magnetic field generator 2 is in surface contact with the inner wall of housing 4. As a result, the generation of fine particles that is caused by the sliding movement is limited. In addition, first end protrusions 24 of first protrusions 23 on both sides thereof in the Y direction are in point contact with first guide portions 42. As a result, the generation of fine particles that is caused by the sliding movement is further limited. Since the generation of fine particles that is caused by the sliding movement is limited, the possibility that the smooth movement of magnetic field generator 2 is lost over time is reduced.

Similarly, when connecting portion 7 of moving element 5 is moved in the X direction in inner space 41 of housing 4, a plurality of second protrusions 73 is guided by second guide portions 44. Second protrusions 73 are restricted in the Y direction and in the Z direction by second grooves 44, and the rotation of moving element 5, especially rod 6, about the X axis is limited. In addition, when connecting portion 7 of moving element 5 is moved in inner space 41 of housing 4 in the X direction, the tops of second protrusions 73 in the Z direction are in line contact with second guide portions 44. Further, second end protrusions 74 of second protrusions 73 are in point contact with second guide portions 44. Accordingly, for the same reason as in first protrusions 23, generation of fine particles that is caused by the sliding movement is limited, and the possibility that the smooth movement of magnetic field generator 2 is lost over time is reduced. Due to a slight gap between second protrusions 73 and second grooves 44, it is impossible to completely prevent rod 6 from rotating about the X axis. However, since moving element 5 is independent of magnetic field generator 2, and is only in contact with magnetic field generator 2 in the X direction, the rotational moment about the X axis that is caused by the rotation of rod 6 is hardly transferred to magnetic field generator 2. As a result, measurement error that is caused by the rotation of magnets 25 can be further limited.

Figure 6A:
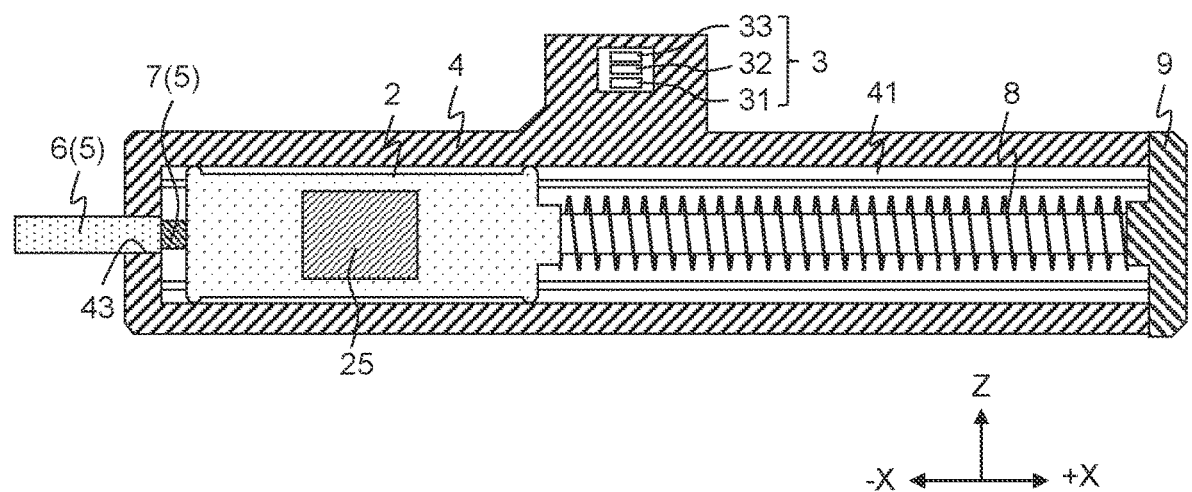
FIGS. 6A and 6B are cross sectional views of a stroke sensor module according to modifications of the first embodiment of the present invention.
Figure 6B:
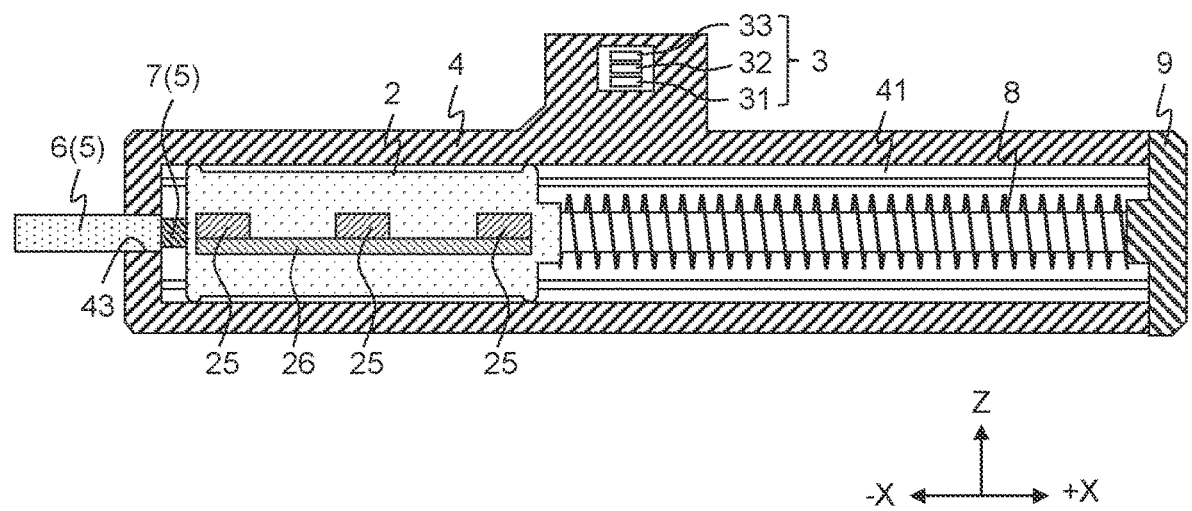

The present embodiment includes both first protrusions 23 and second protrusions 73 are provided, but only either protrusions 23 or protrusions 73 may be provided to prevent fine particles from being generated. As shown in FIG. 6A, magnetic field generator 2 may have only one magnet 25. Since magnetic flux is symmetrically formed on both sides of magnet 25, the relative position of magnetic field generator 2 can be detected by detecting Bx. In this case, magnet 25 is preferably arranged at the center of magnetic field generator 2 in the X direction. Alternatively, as shown in FIG. 6B, magnetic field generator 2 may have three or more magnets 25 that are provided in main body 21 at a constant interval in the X direction. Magnets 25 at both ends in the X direction preferably face corresponding first protrusions 23. For example, magnet 25 and first protrusions 23 are positioned on a straight line that extends in parallel with the Z direction. The number of magnets 25 is not limited and may appropriately be determined taking into consideration the objective and the required accuracy of stroke sensor module 1 and so on. The shape of one or some of first protrusions 23 may be different from that of the other first protrusions 23. For example, the height of upper first protrusions 23 may be lower than that of lower first protrusions 23, so that the total height (the dimension in the Z direction) of magnetic field generator 2 can be limited. As a result, the height of stroke sensor module 1 can be reduced.

In the present embodiment, magnets 25 and moving element 5 are incorporated into and are integrated with stroke sensor module 1. In other words, since moving element 5 is integrated with housing 4 and magnetic field generator 2, the calibration can be precisely performed. The first reason for this is because the calibration can be performed by using measurements at multiple points before stroke sensor module 1 is incorporated into an actual apparatus. For example, in some cases, an object to be measured is connected to a member, such as a plunger, that is configured to stop only at both ends of the movable range. When the calibration is performed after a stroke sensor is incorporated into an actual apparatus, measurements at two points are only available for calibrating stroke sensor module 1. In the present embodiment, since the calibration can be performed in advance, the measurement accuracy of the calibration can be enhanced. Since stroke sensor module 1 is an integral type, there is no need to take into account a positioning error in the installation of stroke sensor module 1. Positioning error in installation leads to an excessive margin, but such margin can be minimized. When the position of each member is shifted due to thermal expansion, the calibration can be performed taking into consideration the thermal expansion. The second reason is because the calibration can be efficiently performed. For example, when magnetic field generator 2 and magnetic field detecting element 3 are separately mounted in an actual apparatus, the calibration needs to be performed in an environment where many elements are present around them. In the present embodiment, the calibration can be efficiently performed by means of a dedicated apparatus in the manufacturing facility of stroke sensor module 1.

Second Embodiment

Figure 7A:
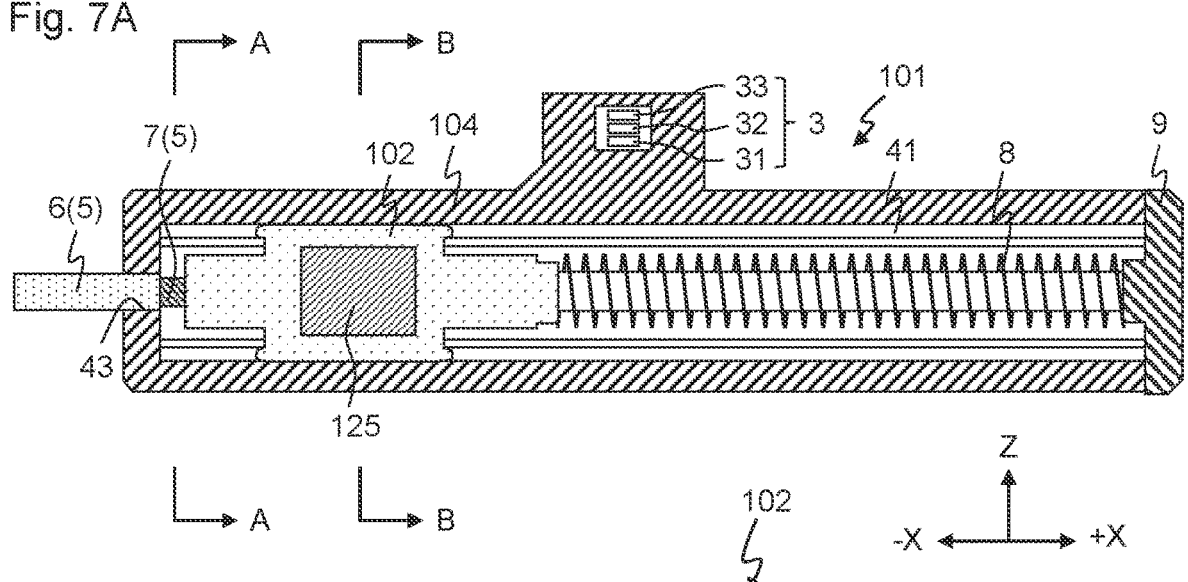
FIGS. 7A to 7D are views of a stroke sensor module according to a second embodiment of the present invention.
Figure 7B:
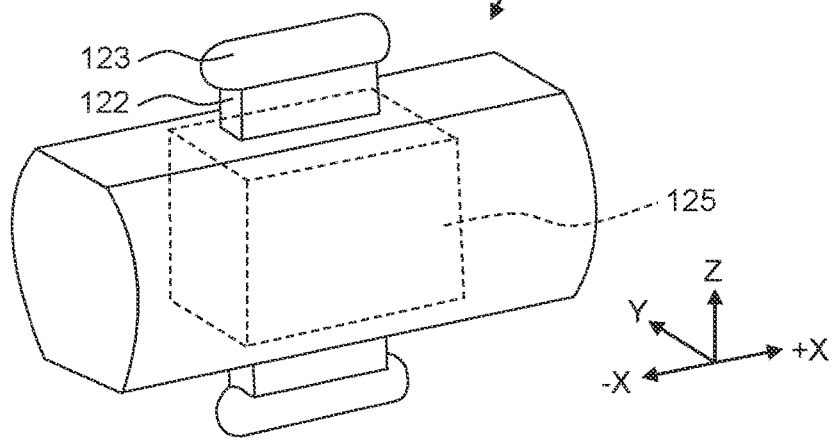
Figure 7C:
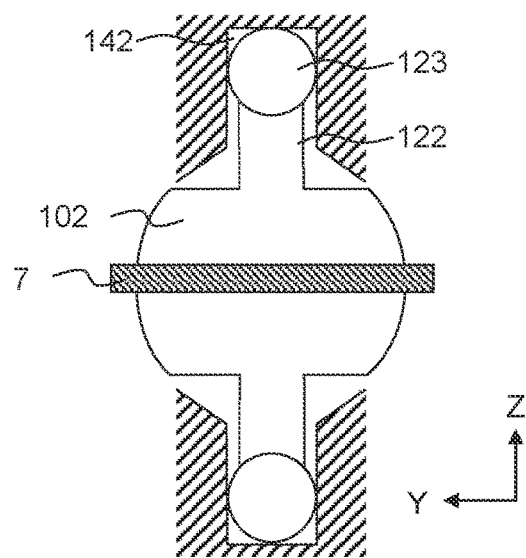
Figure 7D:
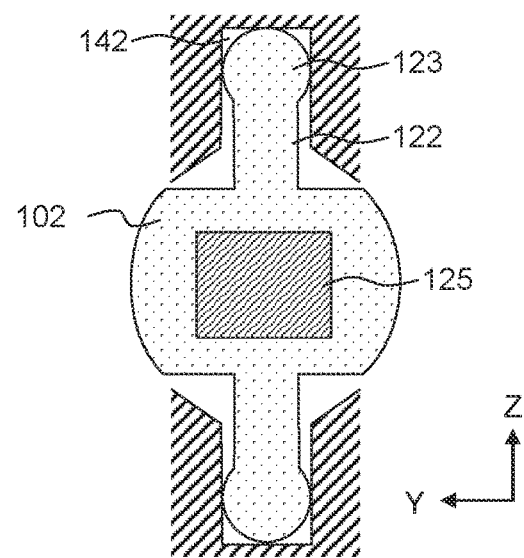

FIG. 7A shows a side cross sectional view of stroke sensor module 101 of the second embodiment, FIG. 7B shows a perspective view of magnetic field generator 102, and FIGS. 7C and 7D show cross sectional views taken along line A-A and along line B-B in FIG. 7A, respectively. In the present embodiment, the configurations of base portions 122 and first protrusions 123 are different from those of the first embodiment. The configurations of moving element 5 and spring member 8 are the same as those of the first embodiment. The configuration of housing 104 is the same as that of the first embodiment except for the shape of first grooves 142 that is modified to match first protrusions 123. Magnetic field generator 102 has only one magnet 125. Base portions 122 are arranged at the center of magnetic field generator 102 in the X direction, and extend in the X direction. First protrusion 123 are ridges that are formed at the ends of base portions 122 and that extend in the X direction. As a result, first protrusions 123 are arranged at the center of magnetic field generator 102 in the X direction and, one magnet 125 faces a plurality of first protrusions 123. Base portions 122 function as the bases for first protrusions 123. The strength of first protrusions 123 can be enhanced by providing base portions 122, as compared to providing long protrusions that protrude from main body 21. The length of first protrusions 123 in the X direction is longer than the length of first protrusions 23 of the first embodiment in the Y direction, and is preferably longer than at least the length of magnet 125 in the X direction. As a result, magnetic field generator 102 is effectively restricted in the Y direction and in the Z direction, and the accuracy of stroke sensor module 101 is enhanced. First protrusions 123 are provided at angular positions θ of zero degree and 180 degrees, but, as in the first embodiment, first protrusions 123 may be arranged in various numbers and at various positions. Due to a substantially cylindrical shape, first protrusion 123 is in line contact with first groove 142 on three sides. As a result, the generation of fine particles can be limited. In the present embodiment, since only one magnet 125 is provided, stroke sensor module 101 can be reduced in size. Although not illustrated, as in the first embodiment, magnetic field generator 102 may have two magnets near both ends of main body 21, or may have more than two magnets that are arranged at a constant interval in the first direction X. First protrusions 123 may extend to where first protrusions 123 face the magnets at both ends in the Z direction, or may be provided between the magnets at both ends such that first protrusions 123 do not overlap with the magnets in the Z direction.

Third Embodiment

Figure 8A:
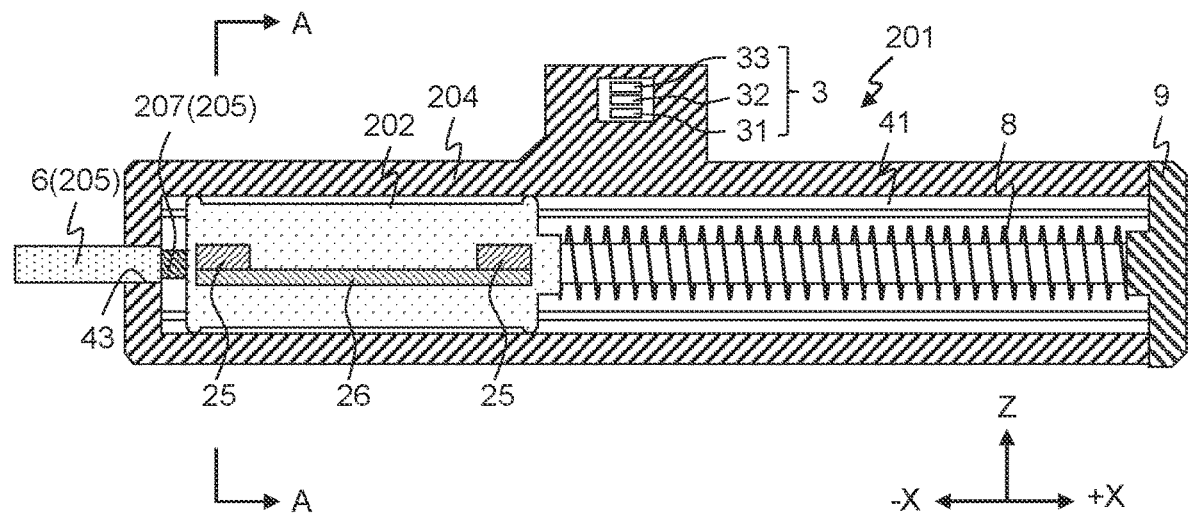
FIGS. 8A and 8B are views of a stroke sensor module according to a third embodiment of the present invention.
Figure 8B:
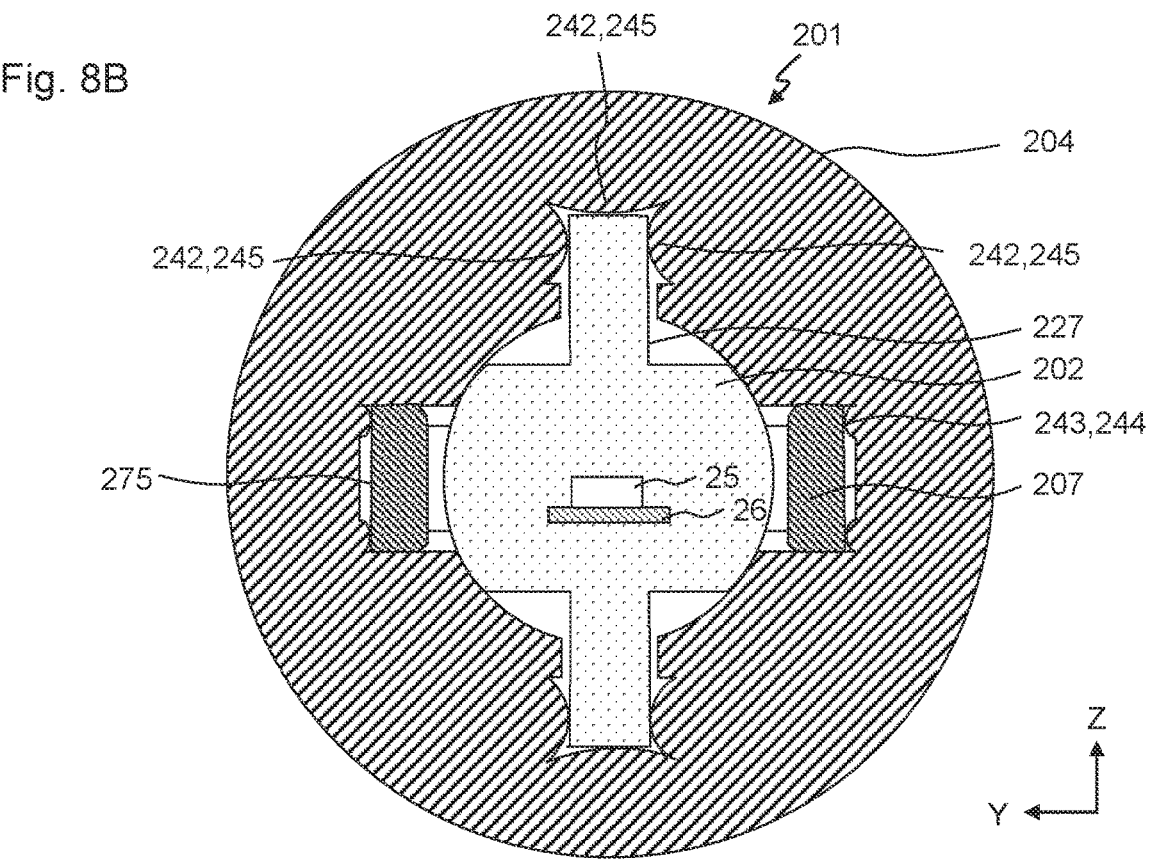

FIGS. 8A and 8B are views similar to FIGS. 2A and 2B showing stroke sensor module 201 of the third embodiment. In the present embodiment, housing 204 has first guide portions 242 having a plurality of first protrusions 245, and magnetic field generator 202 has a plurality of surfaces 227 that are guided by first guide portions 242. Similarly, housing 204 has second guide portions 244 having a plurality of second protrusions 243, and connecting portions 207 of moving element 205 has a plurality of surfaces 275 that are guided by second guide portions 244. That is, in the present embodiment, the relationship between the protrusions and the guide portions is reversed as compared to the first embodiment. The present embodiment has the same effect as the first embodiment. Although not illustrated, magnetic field generator 202 may have a plurality of first protrusions 23, and housing 204 may have a plurality of the second protrusions 243. Similarly, housing 204 may have a plurality of first protrusions 245, and connecting portion 207 may have a plurality of second protrusions 73.

Fourth Embodiment

Figure 9:
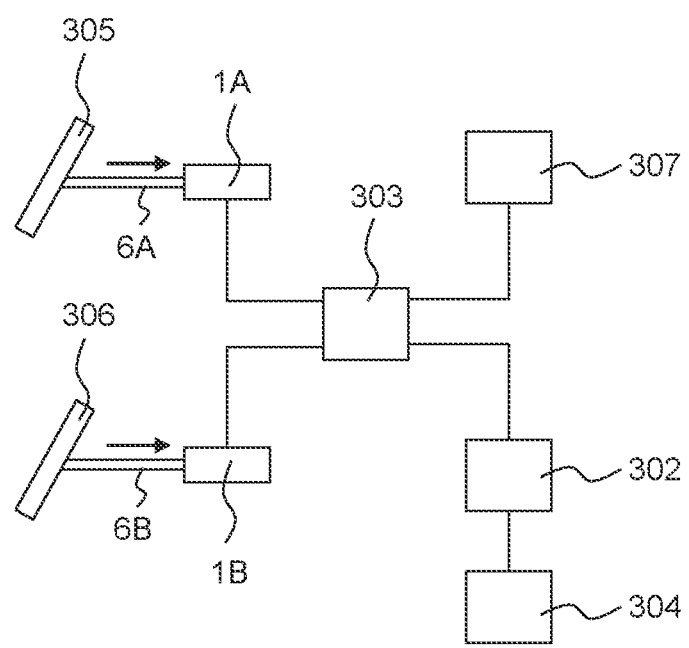
FIG. 9 is a view of a stroke sensor module according to a fourth embodiment of the present invention.

FIG. 9 shows an example in which stroke sensor module 1, 101, 201, 301 according to the first to third and fifth embodiments are applied to a hybrid vehicle. A hybrid vehicle has engine 307, motor 302, control 303 that controls engine 307 and motor 302, and battery 304 that is connected to motor 302. Brake pedal 305, which is a movable element, is connected to rod 6A of first stroke sensor module 1A having the same configuration as stroke sensor module 1, 101, 201, 301 according to the first to third and fifth embodiments, and accelerator pedal 306, which is also a movable element, is connected to rod 6B of second stroke sensor module 1B having the same configuration as stroke sensor module 1, 101, 201, 301 according to the first to third and fifth embodiments. First stroke sensor module 1A measures the amount of depression of brake pedal 305 and sends it to control 303. Second stroke sensor module 1B measures the amount of depression of accelerator pedal 306 and sends it to control 303. Control 303 calculates required torque depending on the amount of depression of accelerator pedal 306, vehicle speed that is separately measured, and so on, and controls engine 307 and motor 302 based on the required torque. Control 303 calculates energy that is regenerated by motor 302, depending on the amount of depression of brake pedal 305, the vehicle speed that is separately measured, and so on. It should be noted that the movable element is not limited to brake pedal 305 and accelerator pedal 306, and any element that is connected to rod 6 of stroke sensor module 1 and that linearly moves rod 6 may be used.

Fifth Embodiment

Figure 10A:
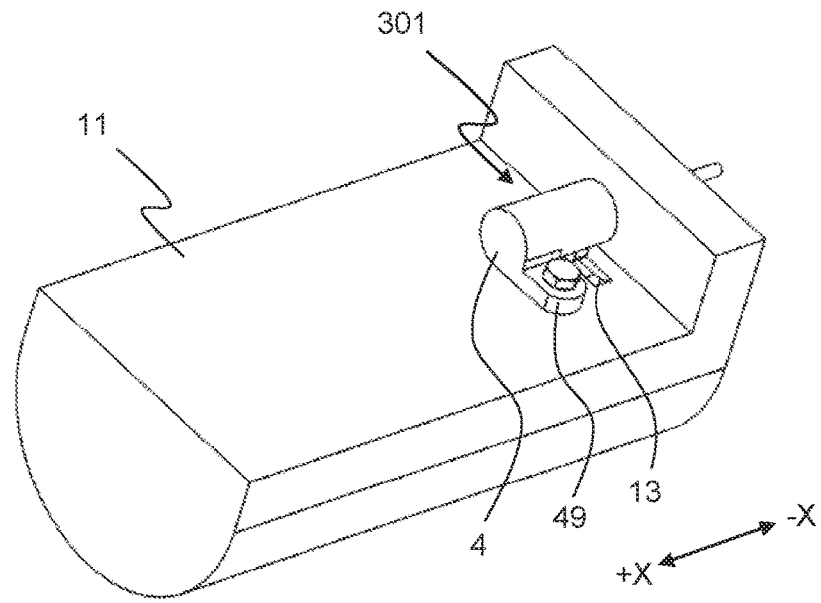
FIGS. 10A and 10B are views of a stroke sensor module according to a fifth embodiment of the present invention.
Figure 10B:
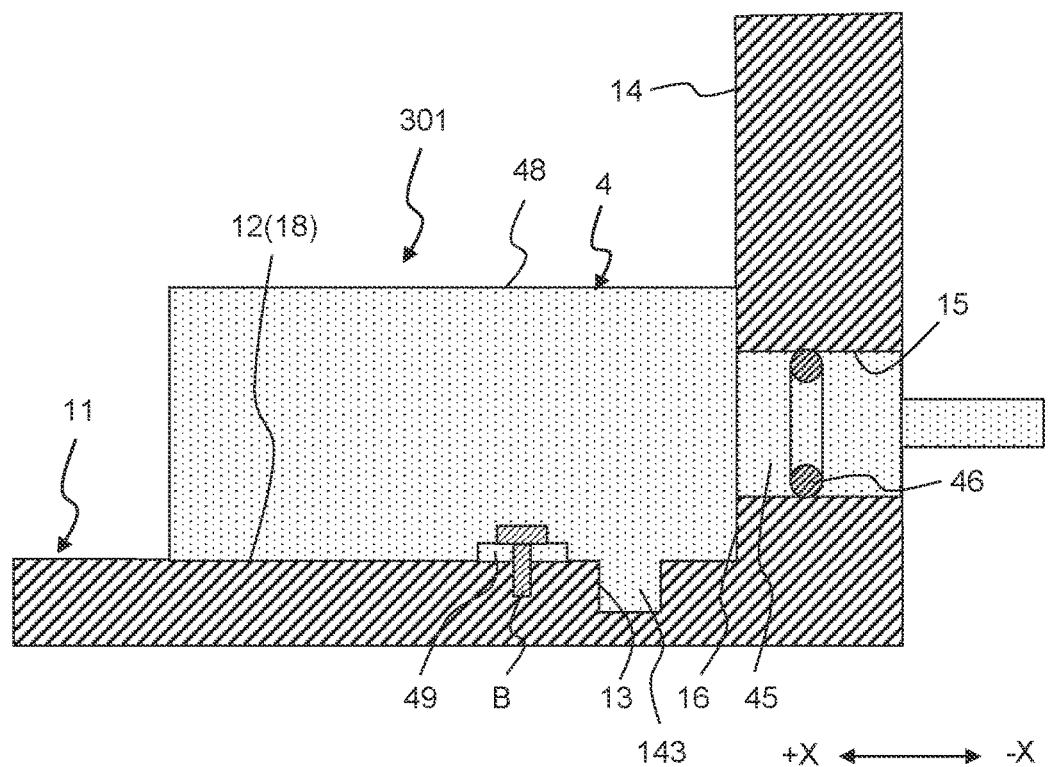
Figure 11A:
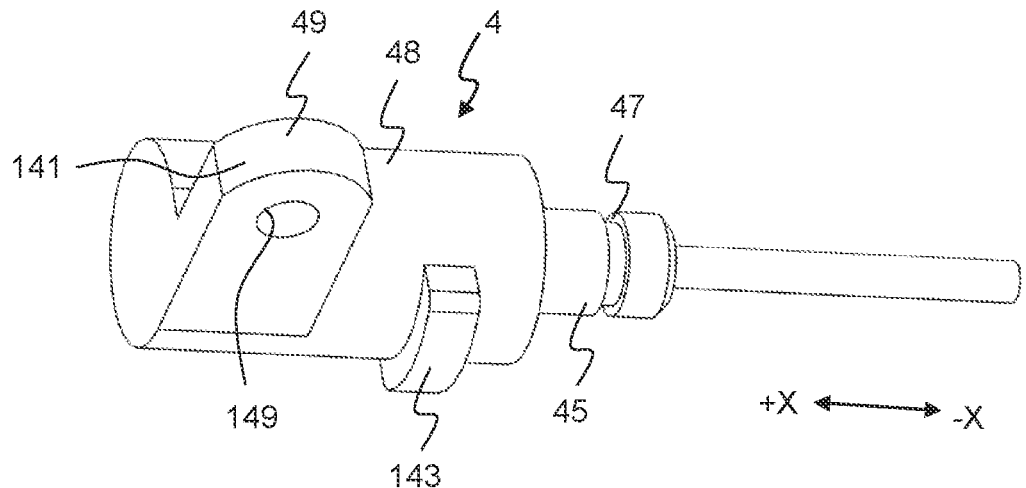
FIGS. 11A and 11B are perspective views of the stroke sensor module and the support, respectively.
Figure 11B:
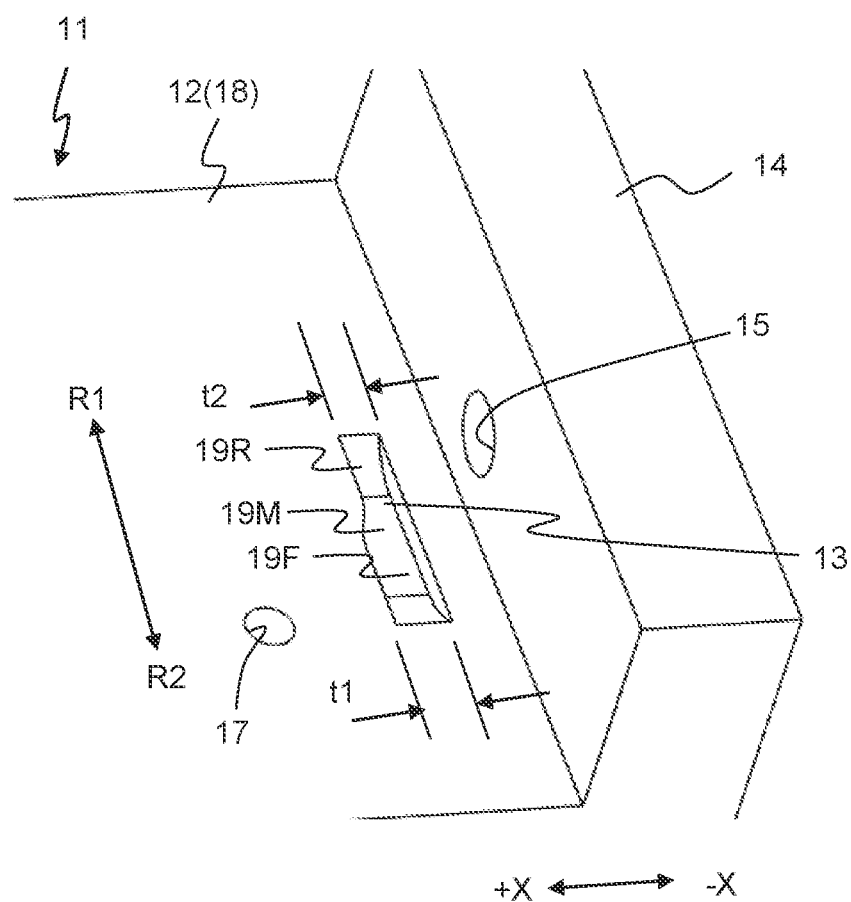

FIGS. 10A and 10B are conceptual views of stroke sensor module 301 according to the fifth embodiment, wherein FIG. 10A shows a perspective view of stroke sensor module 301 that is mounted on support 11, and FIG. 10B shows a side cross sectional view. FIG. 11A shows a perspective view of stroke sensor module 301, as viewed from obliquely below, and FIG. 11B shows a perspective view of support 11 in the vicinity where stroke sensor module 301 is mounted. The present embodiment is characterized in the structure for mounting stroke sensor module 301. The inner structure of stroke sensor module 301 may be any one of the first to the third embodiments.

Sensor module 301 is mounted on support 11. Support 11 has a surface (hereinafter referred to as main surface 12) that extends substantially parallel to the longitudinal axis (the axis that is parallel to the X direction) of stroke sensor module 301. Main surface 12 is mounting surface 18 where mounting portion 49 of sensor module 301 is attached. Main surface 12 further includes positioning portion 13, described later. Accordingly, in the present embodiment, mounting surface 18 for stroke sensor module 301 is the same as the surface having positioning portion 13. Support 11 includes wall portion 14 that stands upright from main surface 12, and wall portion 14 is provided with through-hole 15. Wall portion 14 is perpendicular to main surface 12, but may be connected to main surface 12 at an angle other than right angles. Step 16 is provided between main surface 12 and through-hole 15, and through-hole 15 is apart from main surface 12. That is, wall portion 14 has a region having a predetermined width along the entire circumference of the opening of through-hole 15.

Housing 4 of stroke sensor module 301 is inserted into through-hole 15. The portion of housing 4 that is inserted into through-hole 15 (hereinafter referred to as inserted portion 45) engages through-hole 15. Through-hole 15 and inserted portion 45 are preferably circular, and the inner diameter of through-hole is slightly larger than the outer diameter of inserted portion 45. Since through-hole 15 and inserted portion 45 are circular, inserted portion 45 can be rotated relative to through-hole 15 at any angle. Accordingly, the step of mounting stroke sensor module 301, described later, can be easily performed. O-ring 46 is provided in fitting groove 47, which is formed on the outer circumferential surface of inserted portion 45. O-ring 46 is provided in order to separate the space on one side of wall portion 14 from the space on the other side thereof. For example, when wall portion 14 is a partition wall between the engine compartment and the cabin of a vehicle, O-ring 46 prevents oil from leaking from the engine compartment. If there is no leakage of oil from the engine compartment, then O-ring 46 may be omitted. Housing 4 has large diameter portion 48 that has a larger outer diameter than inserted portion 45 and that is concentric with inserted portion 45. Large diameter portion 48 has mounting portion 49, and the border of inserted portion 45 and large diameter portion 48 is adjacent to step 16 or wall portion 14. Mounting portion 49 of housing 4 includes arm 141 that protrudes from the cylindrical main body of housing 4, and arm 141 has bolt hole 149 into which bolt B is inserted. Main surface 12 has threaded hole 17 that bolt B engages, and mounting portion 49 of housing 4 is fixed to main surface 12 of support 11 by means of bolt B. As will be described later, large diameter portion 48 functions as a stopper that abuts against wall portion 14 when stroke sensor module 301 is mounted. This facilitates the step of mounting stroke sensor module 301.

Figure 12A:
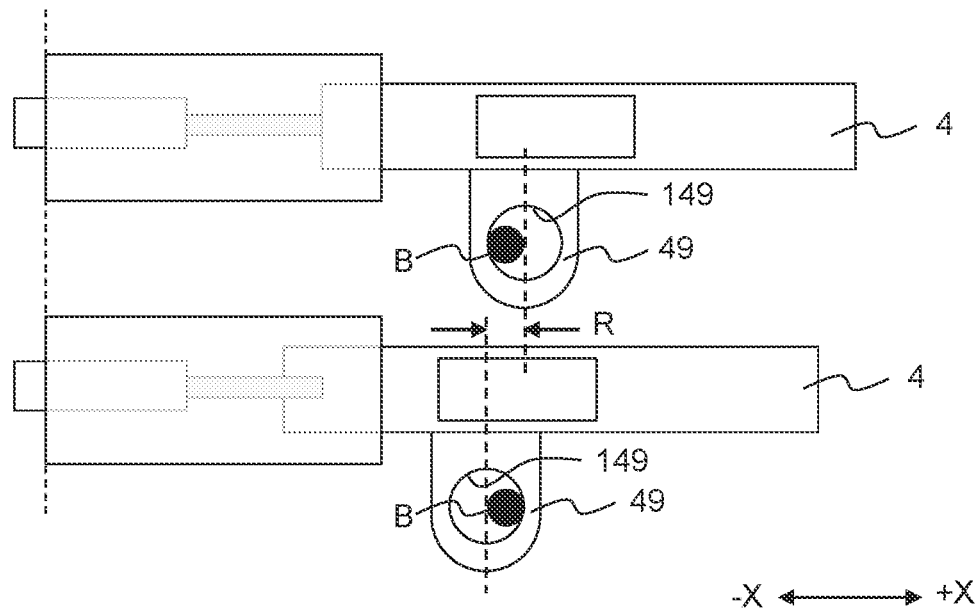
FIGS. 12A and 12B are views illustrating problems when the positioning portion and the engaging portion are not provided.
Figure 12B:
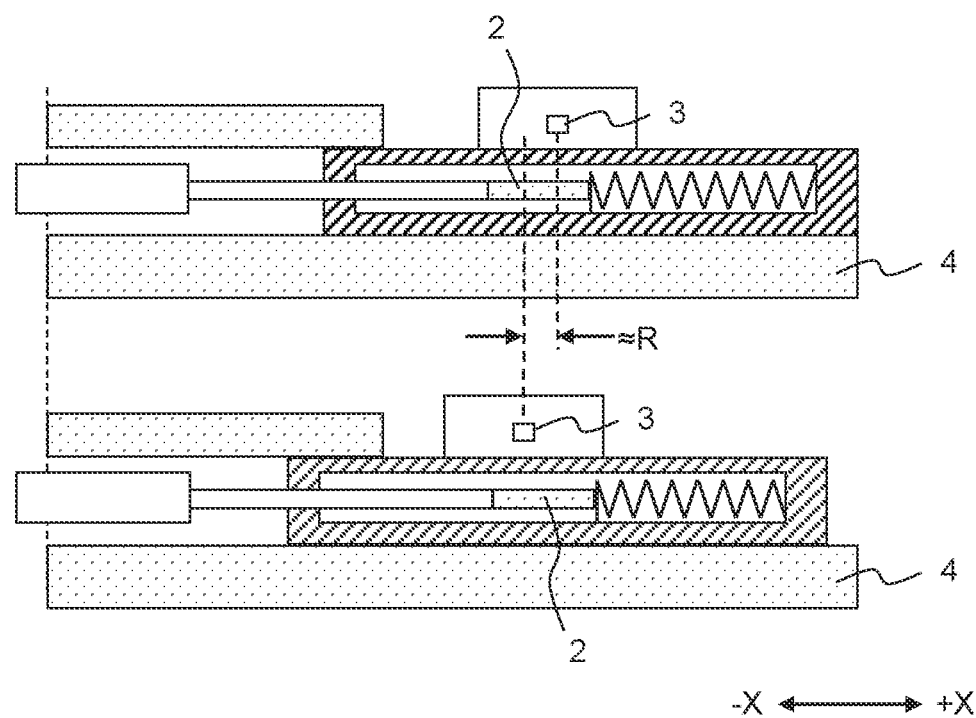

Large diameter portion 48 of housing 4 includes engaging portion 143. Engaging portion 143 is a ridge that circumferentially extends on the main body of housing 4. Positioning portion 13 that is provided on main surface 12 of support 11 is a groove that extends along engaging portion 143 (the ridge). Housing 4 is positioned in first direction X by the engagement of engaging portion 143 with positioning portion 13. Housing 4 is made of resin or metal, and support 11 is also made of resin or metal. Accordingly, these elements can be formed with high precision, and the width of the groove is such that there is only a slight gap between the groove and the ridge. FIGS. 12A and 12B illustrate problems when positioning portion 13 and engaging portion 143 are not provided, wherein FIG. 12A shows a top view of the stroke sensor module, and FIG. 12B shows a side cross sectional view of the stroke sensor module. In the upper part of FIG. 12A, bolt B is at the leftmost position relative to bolt hole 149 of mounting portion 49, and in the lower part of FIG. 12A, bolt B is at the rightmost position relative to bolt hole 149 of mounting portion 49. The upper part and the lower part of FIG. 12B correspond to the upper part and the lower part of FIG. 12A, respectively. Bolt hole 149 has a larger inner diameter than the diameter of the bolt so that bolt B can be easily inserted. This means that housing 4 is mounted on support 11 with mounting error R that corresponds to the difference between the inner diameter of bolt hole 149 and the diameter of the bolt. On the other hand, magnetic field generator 2 is attached to support 11 with a precise positional relationship. Therefore, the relative positions of magnetic field detecting element 3 and magnetic field generator 2 vary within a width that is about the same as mounting error R. However, since magnetic field detecting element 3 is calibrated when it is at a specific position relative to magnetic field generator 2, a shift of the relative position causes an error from the calibration result, as well as a measurement error. In addition, even if magnetic field generator 2 is attached to support 11 at a right position, the positional shift between mounting portion 49 and bolt B may be caused by vibration or impact during use, and this may also cause a measurement error. In the present embodiment, the gap between positioning portion 13 and engaging portion 143 is significantly smaller than mounting error R. Thus, the mounting error in first direction X during mounting and the positional shift in first direction X after mounting are limited by means of positioning portion 13 and engaging portion 143, and such problems are limited.

Figure 13A:
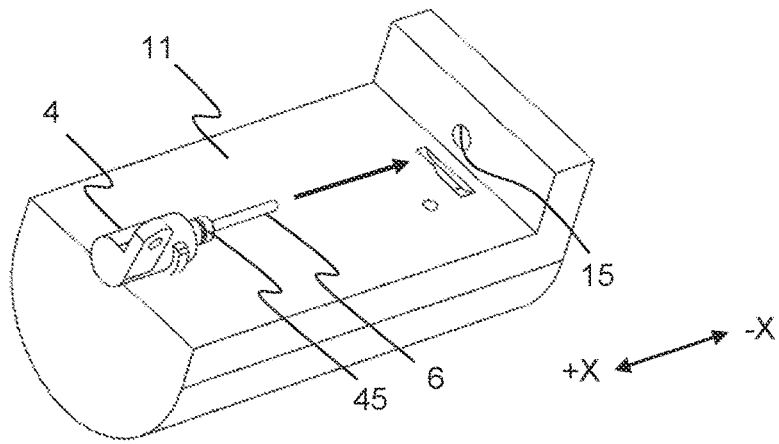
FIGS. 13A to 13E are views showing a method for mounting the stroke sensor module.
Figure 13B:
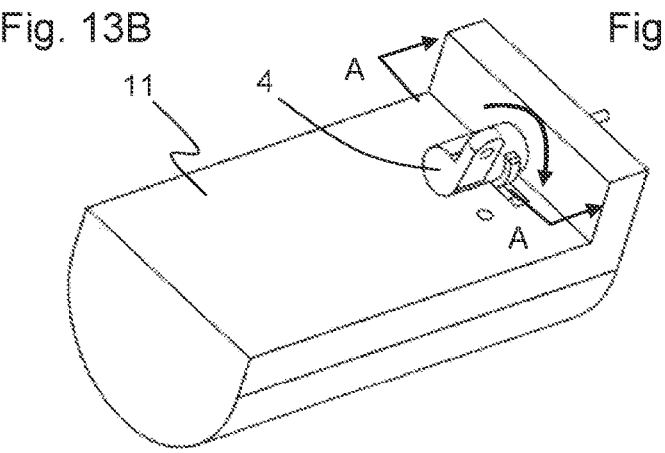
Figure 13C:
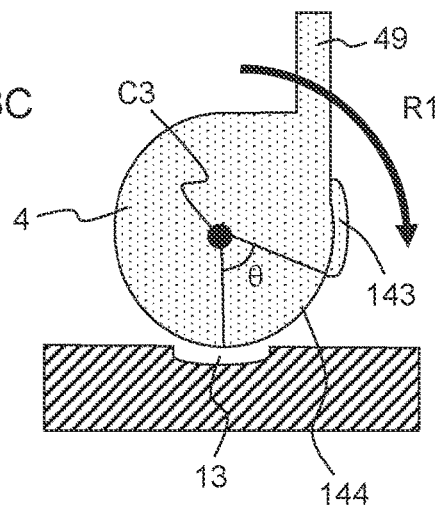
Figure 13D:
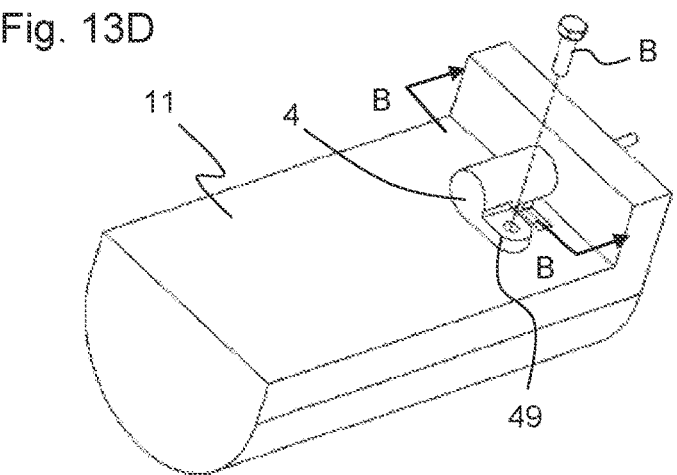
Figure 13E:
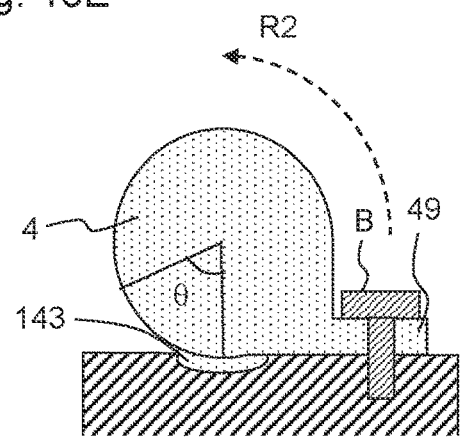

Referring to FIGS. 13A to 13E, a method for mounting stroke sensor module 301 on support 11 will now be described. First, as shown in FIG. 13A, inserted portion 45 of housing 4 is inserted into through-hole 15. Specifically, housing 4 is moved in first direction X with rod 6 ahead in order to arrange inserted portion 45 in through-hole 15. The border of inserted portion 45 and large diameter portion 48 abuts against wall portion 14, and thereby rough positioning can be realized. As a result, the step of visually inspecting the positional relationship between positioning portion 13 and engaging portion 143 can be omitted. Next, as shown in FIG. 13B and FIG. 13C, which is a cross sectional view taken along line A-A in FIG. 13B, housing 4 is rotated in first rotational direction R1 about central axis C3 of through-hole 15. As shown in FIG. 11B, the groove is wider on the upstream side thereof regarding first rotational direction R1 of housing 4. In other words, regarding second rotational direction R2 (the direction opposite to first rotational direction R1) in which mounting portion 49 that is attached to support 11 is rotated in a direction away from support 11, front portion 19F of the groove is wider than rear portion 19R of the groove. Rear portion 19R is the portion where engaging portion 143 finally engages the groove, and front portion 19F is the portion where the groove faces engaging portion 143 while housing 4 is rotated. Width t1 of front portion 19F of the groove is larger than width t2 of rear portion 19R, and the width of transition portion 19M between front portion 19F and rear portion 19R gradually changes. Due to such an arrangement of the groove, even when engaging portion 143 is shifted in first direction X from the center line of rear portion 19R of the groove at the initial position, the positioning of housing 4 in first direction X is automatically carried out while housing 4 is rotated. Next, after the steps described above, engaging portion 143 engages the groove, which is positioning portion 13, and housing 4 is positioned in first direction X. Then, as shown in FIG. 13D and FIG. 13E, which is a cross sectional view taken along line B-B in FIG. 13D, mounting portion 49 of housing 4 that is positioned in first direction X is fixed to mounting surface 18 (main surface 12) of support 11. Specifically, bolt B is inserted into bolt hole 149 of mounting portion 49 and engages threaded hole 17 of support 11.

As described above, since housing 4 is inserted into through-hole 15 and is stably rotated, housing 4 can be easily mounted. Since housing 4 is supported by bolt B and through-hole 15 during and after mounting, it is not necessary to provide a plurality of mounting portions 49. That is, it is sufficient to provide one comparatively large arm 141 and one bolt B. As a result, costs can be reduced and the mounting process can be simplified. In addition, as viewed in first direction X, mounting portion 49 and engaging portion 143 are positioned at different angular positions. For example, referring to FIG. 13C, engaging portion 143 is positioned at three o'clock, and mounting portion 49 is positioned at one o'clock and half. As a result, the fixing operation using bolt B can be performed at a location apart from where engaging portion 143 engages positioning portion 13.

In addition, downstream of engaging portion 143 regarding first rotational direction R1, or upstream of engaging portion 143 regarding second rotational direction R2, the outer circumferential surface of housing 4 is formed in arc shape 144 over predetermined angular range θ1. As a result, housing 4 can be rotated while the outer circumferential surface of support 11 is slid on main surface 12. It should be noted that predetermined angular range θ1 is an angular range over which housing 4 faces main surface 12 while housing 4 is rotated, that is, the angular range between the initial angular position where housing 4 is inserted into through-hole 15 and the final angular position where engaging portion 143 engages positioning portion 13. In a modification, the portion of housing 4 that faces main surface 12 while housing 4 is rotated may be recessed from main surface 12 in order to prevent the rotation of housing 4 from being blocked by support 11.

The positions of engaging portion 143 and mounting portion 49 in first direction X are not limited. In the present embodiment, as shown in FIG. 10B, engaging portion 143 is positioned between mounting portion 49 and wall portion 14, but mounting portion 49 may be positioned between engaging portion 143 and wall portion 14. Furthermore, it is preferable that engaging portion 143 and mounting portion 49 be at the same position in first direction X. When mounting portion 49 is rotated, torsional moment is generated by mounting portion 49 being pressed against main surface 12. When engaging portion 143 and mounting portion 49 are close to each other in the X direction, the torsional moment is reduced because the distance between the point of the force and the point of the application is decreased, and stress on housing 4 and engaging portion 143 can be mitigated.

Figure 14A:
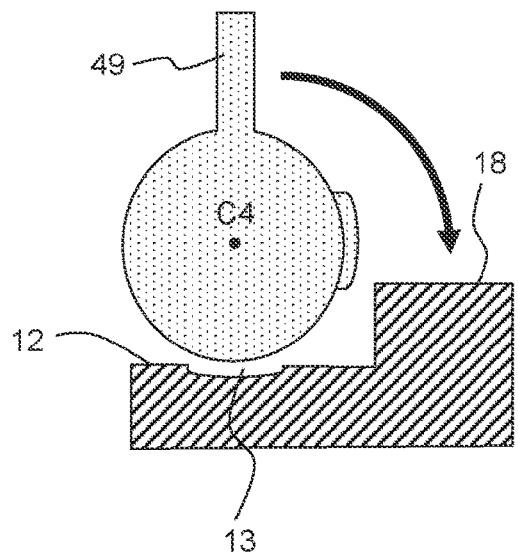
FIGS. 14A, 14B, 15A, 15B, 16A and 16B are views of the housing of the stroke sensor module according to a first modification.
Figure 14B:
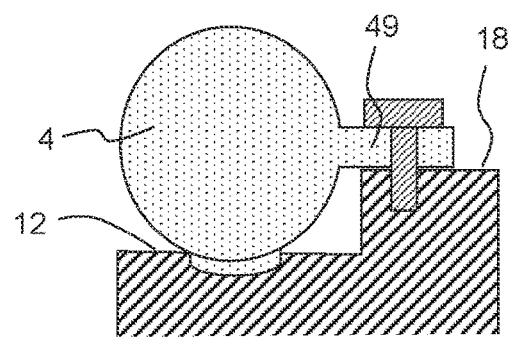
Figure 15A:
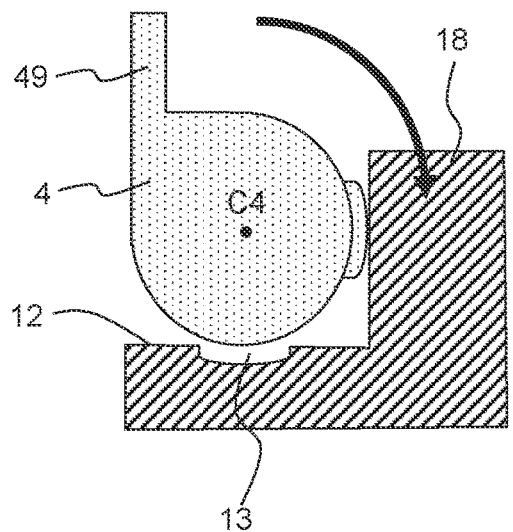
Figure 15B:
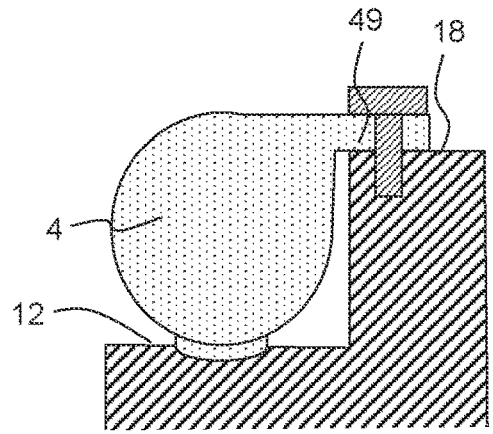
Figure 16A:
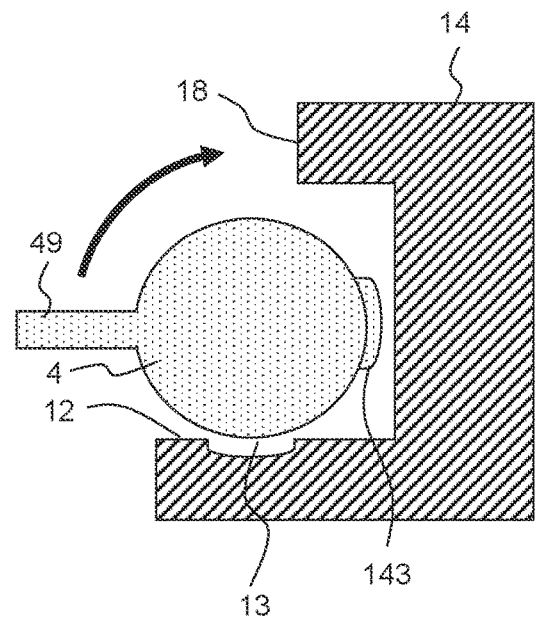
Figure 16B:
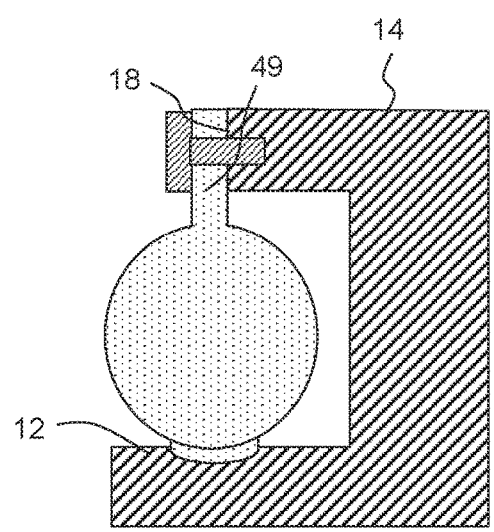

Some modifications of the present embodiment will now be described. FIGS. 14A and 14B shows housing 4 of stroke sensor module 301 according to the first modification. FIGS. 14A and 14B show cross sectional views before and after stroke sensor module 301 is mounted, respectively. Mounting surface 18 is parallel to main surface 12 having positioning portion 13. That is, mounting surface 18 and main surface 12 are positioned at different elevations. In the present modification, mounting surface 18 is positioned between center C4 of housing 4 in first direction X and main surface 12. FIGS. 15A and 15B show cross sectional views before and after stroke sensor module 301 is mounted, respectively. Mounting surface 18 is positioned on the opposite side of main surface 12 with center C4 of housing 4 in first direction X interposed therebetween. In this way, the height of mounting surface 18 is not limited. FIGS. 16A and 16B show cross sectional views before and after stroke sensor module 301 is mounted, respectively. As shown in the figures, mounting surface 18 is perpendicular to main surface 12 having positioning portion 13. The angle between mounting surface 18 and main surface 12 is not limited, and mounting surface 18 may be inclined at any angle (an angle larger than 0 degree and smaller than 180 degree) relative to main surface 12. The modifications shown in FIGS. 14A to 16B may be selected appropriately depending on the shape of support 11, and each modification has the same effect as the present embodiment.

Figure 17A:
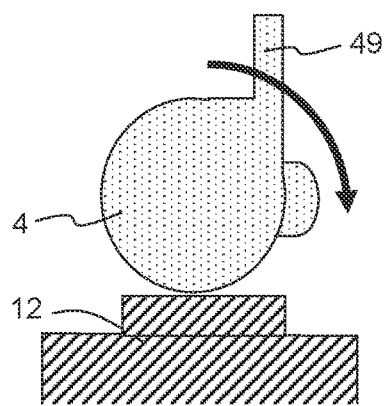
FIGS. 17A and 17B are views of the housing of the stroke sensor module according to a second modification.
Figure 17B:
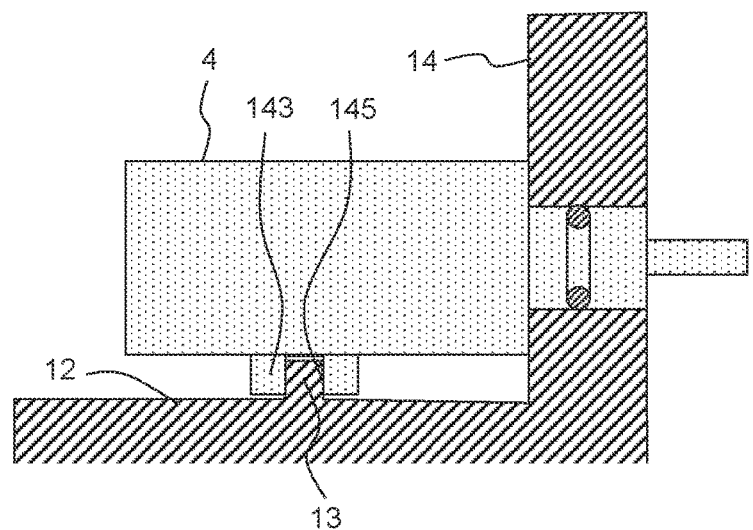

FIGS. 17A, 17B show housing 4 of stroke sensor module 301 according to the second modification. FIG. 17A shows a cross sectional view of stroke sensor module 301, as viewed in first direction X, and FIG. 17B shows a cross sectional view, as viewed in direction perpendicular to first direction X. Engaging portion 143 is a ridge having groove 145 that extends circumferentially on housing 4, and positioning portion 13 is another ridge that extends along groove 145. That is, in the present modification, groove 145 is formed in housing 4. Since the distance between main surface 12 and housing 4 is larger than the height of positioning portion 13, interference with positioning portion 13 can be prevented when housing 4 is inserted into through-hole 15. Although detailed descriptions are omitted, groove 145 may have the same shape as the groove of the above-mentioned embodiment.

Figure 18A:
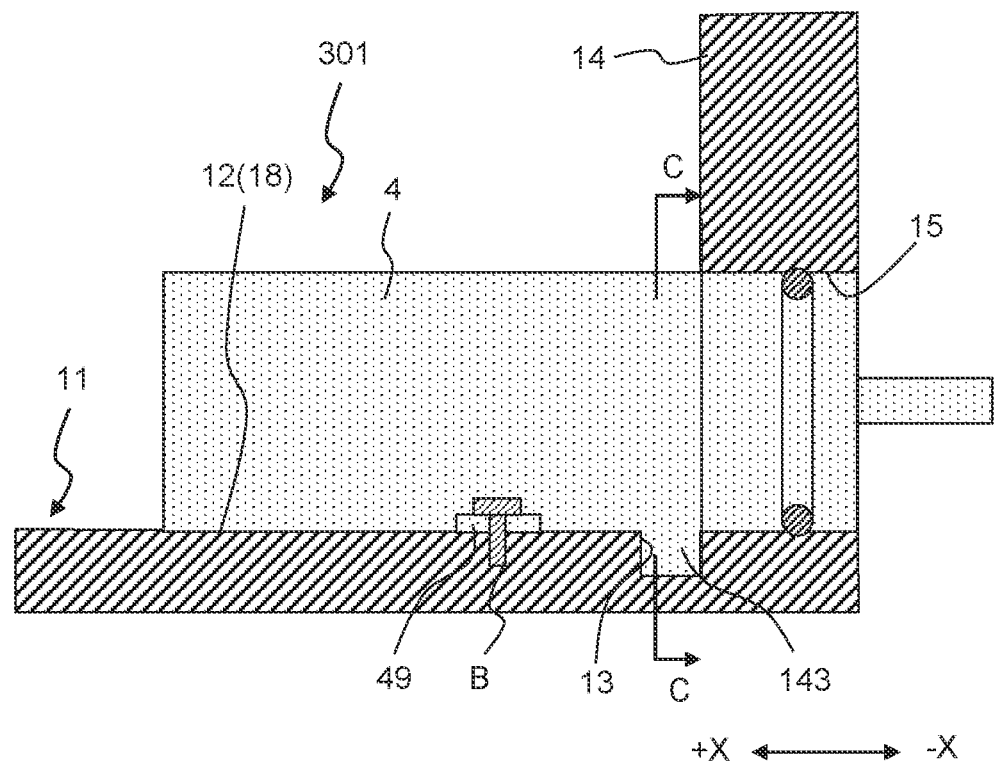
FIGS. 18A and 18B are views of the housing of the stroke sensor module according to a third modification.
Figure 18B:
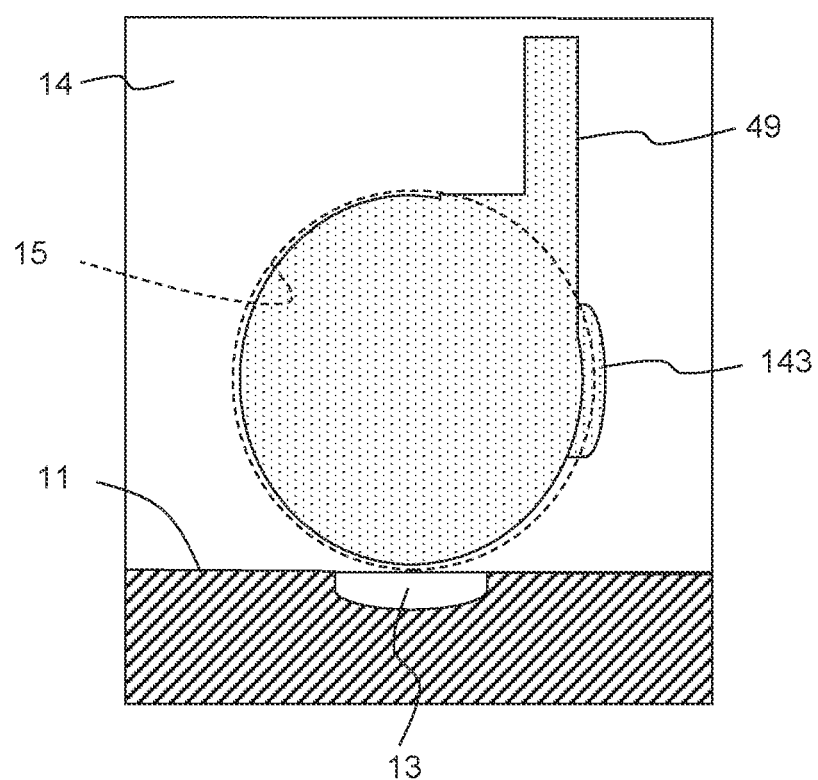

FIGS. 18A and 18B show housing 4 of stroke sensor module 301 according to the third modification. FIG. 18A shows a cross sectional view of stroke sensor module 301, as viewed in a direction perpendicular to first direction X, and FIG. 18B shows a cross sectional view of stroke sensor module 301 before stroke sensor module 301 is mounted, as viewed in first direction X. Through-hole 15 is provided in wall portion 14, but main surface 12 having positioning portion 13 is continuous with the inner surface of through-hole 15, and step 16 is not provided unlike in the above-mentioned embodiment. Therefore, in the present modification, engaging portion 143 is provided adjacent to the circumference of the opening of through-hole 15 or wall portion 14 regarding first direction X. As a result, when housing 4 is inserted into through-hole 1, the side of engaging portion 143 abuts against the circumference of the opening of through-hole 15 or wall portion 14. In the present modification, since engaging portion 143 functions as a stopper, stroke sensor module 301 can be mounted on support 11 by the same steps as in the above-mentioned embodiment.

Figure 19A:
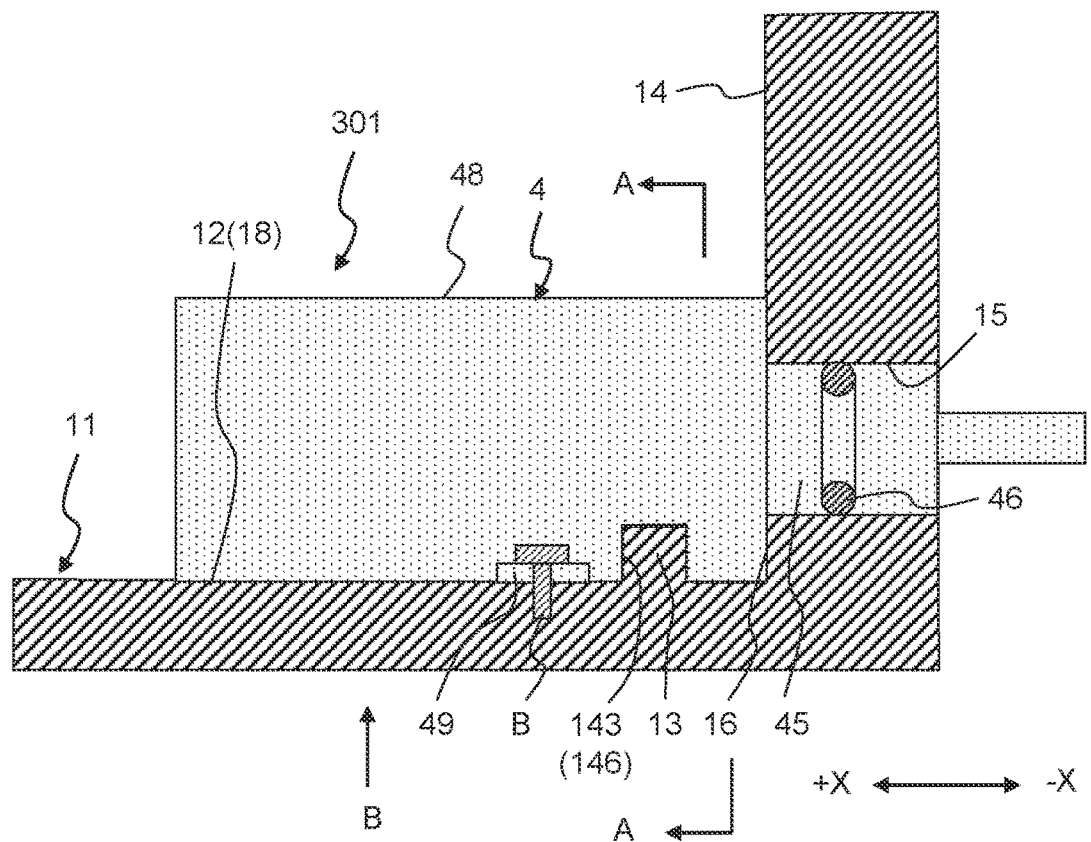
FIGS. 19A to 19C are views of the housing of the stroke sensor module according to a fourth modification.
Figure 19B:
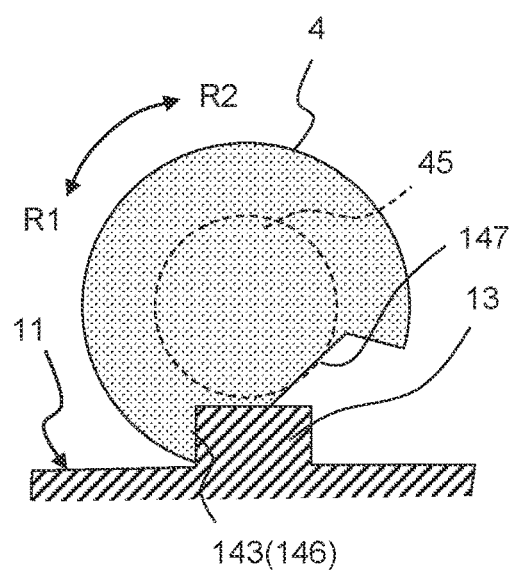
Figure 19C:
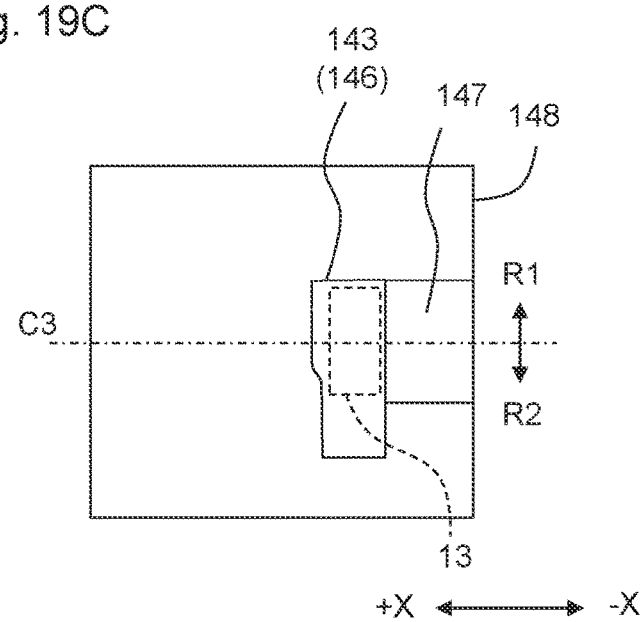

FIGS. 19A to 19C shows housing 4 of stroke sensor module 301 according to the fourth modification. FIG. 19A shows a cross sectional view of stroke sensor module 301, as viewed in a direction perpendicular to first direction X, and FIG. 19B shows a cross sectional view taken along line A-A in FIG. 19A. FIG. 19C shows a bottom view of housing 4, as viewed in direction B in FIG. 19A, while stroke sensor module 301 is mounted on support 11. Engaging portion 143 is circumferential groove 146 that extends circumferentially on housing 4, and positioning portion 13 is a ridge that extends along circumferential groove 146. In the present modification, the groove is formed in housing 4 like the second modification, but circumferential groove 146 is formed on the circumferential surface of housing 4. Housing 4 has axial groove 147 that is connected to circumferential groove 146. Axial groove 147 extends in first direction X from end surface 148 of large diameter portion 48 of housing 4.

Stroke sensor module 301 may be mounted in the same manner as the steps shown in FIGS. 13A to 13E. That is, housing 4 is moved in first direction X first, as shown in FIG. 13A, in order to insert inserted portion 45 into through-hole 1. FIG. 19C shows this state. When housing 4 is moved in first direction X, positioning portion 13 (the ridge) moves relative to axial groove 147 within axial groove 147. Thus, interference between positioning portion 13 and housing 4 can be prevented. In other words, when housing 4 is rotated a predetermined angle in a direction in which mounting portion 49 is moved away from support 11 (second rotational direction R2), axial groove 147 contains positioning portion 13 (the ridge), as viewed in first direction X. Next, as shown in FIGS. 13B and 13C, housing 4 is rotated in first rotational direction R1 about central axis C3 of through-hole 15. The steps shown in FIGS. 13B and 13C may be carried out in the same manner as described in the fifth embodiment.

According to the modification, the strength of positioning portion 13 can be easily ensured, as compared to the second modification, because it is easy to ensure the height of positioning portion 13 and the depth of circumferential groove 146. Furthermore, axial groove 147 functions as a guide portion to guide housing 4 in first direction X when inserted portion 45 of housing 4 is inserted into through-hole 15. Accordingly, stroke sensor module 301 can be mounted still more easily in the present modification. In order to prevent circumferential groove 146 from interfering with the inner structure of stroke sensor module 301, large diameter portion 48 may be formed in an oval shape or an egg-like shape in which circumferential groove 146 protrudes outwardly.

Although certain preferred embodiments of the present invention have been shown and described in detail, it should be understood that various changes and modifications may be made without departing from the spirit or scope of the appended claims.

What is claimed is:

1. A stroke sensor module comprising:
a moving element that is moved in a first direction;
a magnetic field generator that is moved in the first direction together with the moving element;
a magnetic field detecting element that detects movement of the magnetic field generator; and
a housing that houses a part of the moving element and the magnetic field generator, wherein
at least either the moving element or the magnetic field generator has a plurality of protrusions that are provided at different angular positions, as viewed in the first direction,
the housing has guide portions that guide the protrusions,
the moving element is independent of the magnetic field generator and is only in contact with the magnetic field generator in the first direction,
the housing has an inner space that houses a part of the moving element and the magnetic field generator, and a hole that communicates with the inner space,
the moving element has a rod that is movably inserted into the hole and a connecting portion that is attached to an end of the rod and that is in contact with the magnetic field generator, and
the connecting portion is housed in the inner space and the hole is sized so as not to allow the connecting portion to pass through the hole.

2. The stroke sensor module according to claim 1, wherein the magnetic field generator has a main body having a magnet and a plurality of base portions that extend in the first direction along the main body,
wherein the protrusions are formed at tops of the base portions.

3. The stroke sensor module according to claim 1, wherein at least some of the protrusions are arranged on both sides of the magnetic field generator in the first direction, and more than one of the protrusions are arranged on each side of the magnetic field generator in the first direction.

4. The stroke sensor module according to claim 3, wherein the magnetic field generator has one magnet, and the magnet is arranged at a center of the magnetic field generator in the first direction.

5. The stroke sensor module according to claim 3, wherein the magnetic field generator has two or more magnets that are provided in the main body and that are spaced at a constant interval in the first direction, and the magnets at both ends face the protrusions.

6. The stroke sensor module according to claim 3, wherein the protrusions are ridges that extend in a direction that is perpendicular to the first direction.

7. The stroke sensor module according to claim 1, wherein at least one or some of the protrusions is arranged at a center of the magnetic field generator in the first direction.

8. The stroke sensor module according to claim 7, wherein the magnetic field generator has one magnet, and the magnet faces the protrusions.

9. The stroke sensor module according to claim 7, wherein the magnetic field generator has two or more magnets that are provided in the main body and that are spaced at a constant interval in the first direction.

10. The stroke sensor module according to claim 7, wherein the protrusions are ridges that extend in parallel with the first direction.

11. The stroke sensor module according to claim 1, wherein the moving element is integrated with the housing and the magnetic field generator.

12. The stroke sensor module according to claim 1, further comprising a spring member that is provided in the inner space at a side opposite to the moving element with the magnetic field generator interposed therebetween,
wherein the connecting portion has a base portion that is attached to the rod, and a pair of arm portions each attached to the base portion only at one end of the arm portion and extending from the base portion in a moving direction of the moving element, wherein the magnetic field generator is in contact with the base portion, is sandwiched between the arm portions, and is biased toward the moving element by the spring member.

13. The stroke sensor module according to claim 1, wherein at least some of the protrusions are provided in the connecting portion.

14. The stroke sensor module according to claim 1, wherein the guide portions of the housing have grooves that extend in the first direction and that house the respective protrusions.

15. The stroke sensor module according to claim 1, wherein the protrusions have a same shape.

16. The stroke sensor module according to claim 1, wherein one of the protrusions has a shape that is different from a shape of another protrusion.

17. The stroke sensor module according to claim 1, wherein the protrusions are provided at opposite positions of the magnetic field generator.

18. The stroke sensor module according to claim 1, wherein the moving element is connected to a movable element.

19. The stroke sensor module according to claim 18, wherein the movable element is a brake pedal.

20. The stroke sensor module according to claim 18, wherein the movable element is an accelerator pedal.

21. A structure for mounting the stroke sensor module according to claim 1, in which the stroke sensor module is mounted on a support having a through-hole and a positioning portion, wherein
the housing has an inserted portion that is inserted into the through-hole, a mounting portion that is fixed to a mounting surface of the support, and an engaging portion that engages the positioning portion so as to position the housing in the first direction, and
the mounting portion and the engaging portion are positioned at different angular positions, as viewed in the first direction.

22. The stroke sensor module according to claim 1, wherein the guide portion has a plurality of protrusions.

23. The stroke sensor module according to claim 1, wherein
the protrusions are in line contact with the guide portions.

24. The stroke sensor module according to claim 23, wherein the magnetic field generator has a main body having a magnet and a plurality of base portions that extend in the first direction along the main body,
wherein the protrusions are formed at tops of the base portions.

25. The stroke sensor module according to claim 23, wherein at least some of the protrusions are arranged on both sides of the magnetic field generator in the first direction, and more than one of the protrusions are arranged on each side of the magnetic field generator in the first direction.

26. The stroke sensor module according to claim 25, wherein the magnetic field generator has one magnet, and the magnet is arranged at a center of the magnetic field generator in the first direction.

27. The stroke sensor module according to claim 25, wherein the magnetic field generator has two or more magnets that are provided in the main body and that are spaced at a constant interval in the first direction, and the magnets at both ends face the protrusions.

28. The stroke sensor module according to claim 25, wherein the protrusions are ridges that extend in a direction that is perpendicular to the first direction.

29. The stroke sensor module according to claim 23, wherein at least one or some of the protrusions is arranged at a center of the magnetic field generator in the first direction.

30. The stroke sensor module according to claim 29, wherein the magnetic field generator has one magnet, and the magnet faces the protrusions.

31. The stroke sensor module according to claim 29, wherein the magnetic field generator has two or more magnets that are provided in the main body and that are spaced at a constant interval in the first direction.

32. The stroke sensor module according to claim 29, wherein the protrusions are ridges that extend in parallel with the first direction.

33. The stroke sensor module according to claim 23, wherein the moving element is integrated with the housing and the magnetic field generator.

34. The stroke sensor module according to claim 23, wherein each protrusion has an elongate shape that extends along a central axis thereof, and a portion of the protrusion that is in line contact with the guide portion is a part of a curved surface that protrudes in a direction away from the central axis.

35. The stroke sensor module according to claim 23, wherein each protrusion has curved end protrusions at both ends thereof in a direction that is parallel to the central axis, wherein the curved end protrusions are in point contact with the guide portion.

36. The stroke sensor module according to claim 23, wherein the guide portions of the housing have grooves that extend in the first direction and that house the respective protrusions.

37. The stroke sensor module according to claim 23, wherein the protrusions have a same shape.

38. The stroke sensor module according to claim 23, wherein one of the protrusions has a shape that is different from a shape of another protrusion.

39. The stroke sensor module according to claim 23, wherein the protrusions are provided at opposite positions of the magnetic field generator.

40. The stroke sensor module according to claim 23, wherein the guide portion has a plurality of protrusions.

41. The stroke sensor module according to claim 23, wherein the moving element is connected to a movable element.

42. The stroke sensor module according to claim 41, wherein the movable element is a brake pedal.

43. The stroke sensor module according to claim 41, wherein the movable element is an accelerator pedal.

44. A structure for mounting the stroke sensor module according to claim 23, in which the stroke sensor module is mounted on a support having a through-hole and a positioning portion,
wherein the housing has an inserted portion that is inserted into the through-hole, a mounting portion that is fixed to a mounting surface of the support, and an engaging portion that engages the positioning portion so as to position the housing in the first direction, and
the mounting portion and the engaging portion are positioned at different angular positions, as viewed in the first direction.

45. A method for mounting a stroke sensor module on a support having a through-hole and a positioning portion, wherein the stroke sensor module comprises:
a moving element that is moved in a first direction;
a magnetic field generator that is moved in the first direction together with the moving element;
a magnetic field detecting element that detects movement of the magnetic field generator; and
a housing that houses a part of the moving element and the magnetic field generator, wherein
at least either the moving element or the magnetic field generator has a plurality of protrusions that are provided at different angular positions, as viewed in the first direction,
the housing has guide portions that guide the protrusions,
the housing has an inserted portion that is inserted into the through-hole, a mounting portion that is fixed to a mounting surface of the support, and engaging portion that engages the positioning portion so as to position the housing in the first direction, and
the mounting portion and the engaging portion are positioned at different angular positions, as viewed in the first direction,
the method comprises the steps of:
inserting the inserted portion of the housing into the through-hole, and rotating the housing about a central axis of the through-hole, thereby engaging the engaging portion with the positioning portion so as to position the housing in the first direction; and
fixing the mounting portion of the housing that is positioned in the first direction to the mounting surface of the support.

46. A stroke sensor module being configured to be mounted on a support having a through-hole and a positioning portion, the stroke sensor module comprising:
a moving element that is moved in a first direction;
a magnetic field generator that is moved in the first direction together with the moving element;
a magnetic field detecting element that detects movement of the magnetic field generator; and
a housing that houses a part of the moving element and the magnetic field generator, wherein
the housing has an inserted portion that is inserted into the through-hole so as to engage the through-hole, a mounting portion that is fixed to a mounting surface of the support, and an engaging portion that engages the positioning portion so as to position the housing in the first direction,
the mounting portion and the engaging portion are positioned at different angular positions, as viewed in the first direction, and
the engaging portion is a circumferential groove that circumferentially extends on the housing, the positioning portion is a ridge that extends along the circumferential groove, the housing has an axial groove that is connected to the circumferential groove, the axial groove extends in the first direction from a side of the housing, and when the housing is rotated a predetermined angle in a direction in which the mounting portion is moved away from the support, the axial groove contains the ridge, as viewed in the first direction.

47. A stroke sensor module being configured to be mounted on a support having a through-hole and a positioning portion, the stroke sensor module comprising:
a moving element that is moved in a first direction;
a magnetic field generator that is moved in the first direction together with the moving element;
a magnetic field detecting element that detects movement of the magnetic field generator; and
a housing that houses a part of the moving element and the magnetic field generator, wherein
the housing has:
an inserted portion that is inserted into the through-hole so as to engage the through-hole, and
a mounting portion that is fixed to a mounting surface of the support, and an engaging portion that engages the positioning portion so as to position the housing in the first direction, and
the mounting portion and the engaging portion are positioned at different angular positions, as viewed in the first direction,
regarding a direction in which the housing is rotated such that the mounting portion is moved away from the support, a portion of the housing upstream of the engaging portion has an arc shape over a predetermined angular range.

\* \* \* \* \*